US011507821B2

(12) United States Patent
Motomura

(10) Patent No.: US 11,507,821 B2
(45) Date of Patent: Nov. 22, 2022

(54) NEURAL NETWORK CIRCUIT AND NEURAL NETWORK INTEGRATED CIRCUIT

(71) Applicant: Tokyo Institute of Technology, Tokyo (JP)

(72) Inventor: Masato Motomura, Sapporo (JP)

(73) Assignee: Tokyo Institute of Technology, Tokyo (JP)

( * ) Notice: Subject to any disclaimer, the term of this patent is extended or adjusted under 35 U.S.C. 154(b) by 951 days.

(21) Appl. No.: 16/098,968

(22) PCT Filed: May 19, 2017

(86) PCT No.: PCT/JP2017/018836
§ 371 (c)(1),
(2) Date: Apr. 10, 2019

(87) PCT Pub. No.: WO2017/200088
PCT Pub. Date: Nov. 23, 2017

(65) Prior Publication Data
US 2019/0251432 A1    Aug. 15, 2019

(30) Foreign Application Priority Data

May 19, 2016   (JP) .............................. JP2016-100694
Nov. 15, 2016  (JP) .............................. JP2016-222275

(51) Int. Cl.
*G06N 3/08*     (2006.01)
*G06N 3/063*    (2006.01)
*G06F 7/544*    (2006.01)

(52) U.S. Cl.
CPC ............. *G06N 3/08* (2013.01); *G06F 7/5443* (2013.01); *G06N 3/063* (2013.01); *G06F 2207/4822* (2013.01)

(58) Field of Classification Search
CPC .. G06F 7/5443; G06F 2207/4822; G06N 3/08
See application file for complete search history.

(56) References Cited

U.S. PATENT DOCUMENTS 4,904,881 A * 2/1990 Castro .................. G06K 9/6215
                                                 708/801
4,999,525 A * 3/1991 Park ...................... G06N 3/063
                                                 708/801

(Continued)

OTHER PUBLICATIONS

Matthieu Courbariaux et al., "Binarized Neural Networks: Training Deep Neural Networks with Weights and Activations Constrained to +1 or −1," Thesis, arXiv: 1602.02830v3 [cs, LG], Revised Mar. 17, 2016 (URL: 1495159321498_1, 02830), Only Abstract (1 page) (discussed in the spec).

(Continued)

*Primary Examiner* — Zachary K Huson
(74) *Attorney, Agent, or Firm* — Locke Lord LLP

(57) ABSTRACT

The purpose of the present invention is to provide an efficient and versatile neural network circuit while significantly reducing the size and cost of the circuit. The neural network circuit comprises: memory cells 1 which are provided in the same number as that of pieces of input data I, and each of which performs a multiplication function by which each piece of input data I consisting of one bit is multiplied by a weighting coefficient W; and a majority determination circuit 2 for performing an addition/application function by which the multiplication results of the memory cells 1 are added up, an activation function is applied to the addition result, and a piece of one-bit output data is outputted.

16 Claims, 18 Drawing Sheets

(56) References Cited

U.S. PATENT DOCUMENTS

| | | | | |
|---|---|---|---|---|
| 5,097,141 A | * | 3/1992 | Leivian | G06F 7/544 |
| | | | | 706/41 |
| 2005/0134307 A1 | * | 6/2005 | Stojanovic | H04L 25/028 |
| | | | | 326/31 |

OTHER PUBLICATIONS

Mohammad Rastegari et al., "XNOR-Net: ImageNet Classification Using Binary Convolutional Neural Networks," Thesis, arXiv: 1603.05279v2 [cs.CV, revised Apr. 19, 2016 (URL: 1495159321498_ 0.05279), Only English abstract (1 page). (discussed in the spec).

* cited by examiner $$O = F(W_1 \times I_1 + W_2 \times I_2 + \cdots + W_n \times I_n) \cdots (1)$$

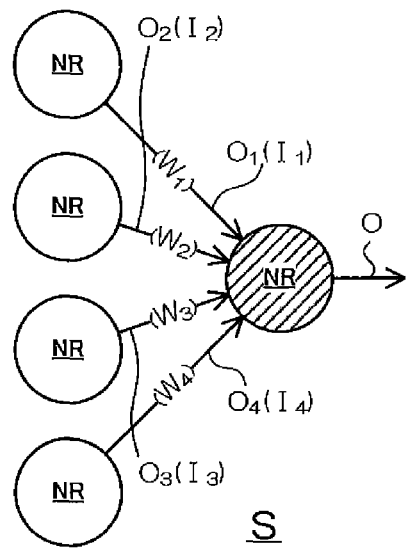
FIG. 2 (a)
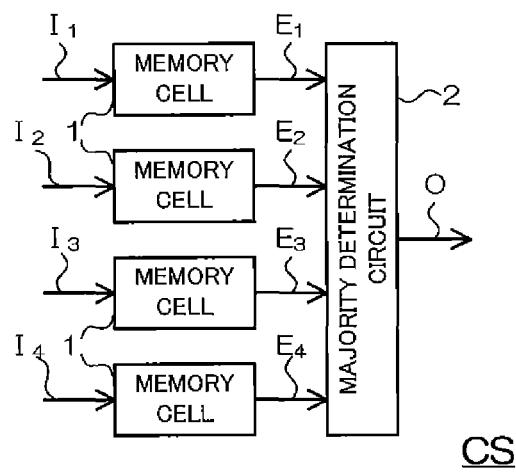
FIG. 2 (b)
| STORAGE VALUE | INPUT DATA I | OUTPUT DATA E |
|---|---|---|
| 0 | 0 | 1 |
| 0 | 1 | 0 |
| 1 | 0 | 0 |
| 1 | 1 | 1 |
| NC | X | NC |
FIG. 2 (c)

FIG. 3 (a)
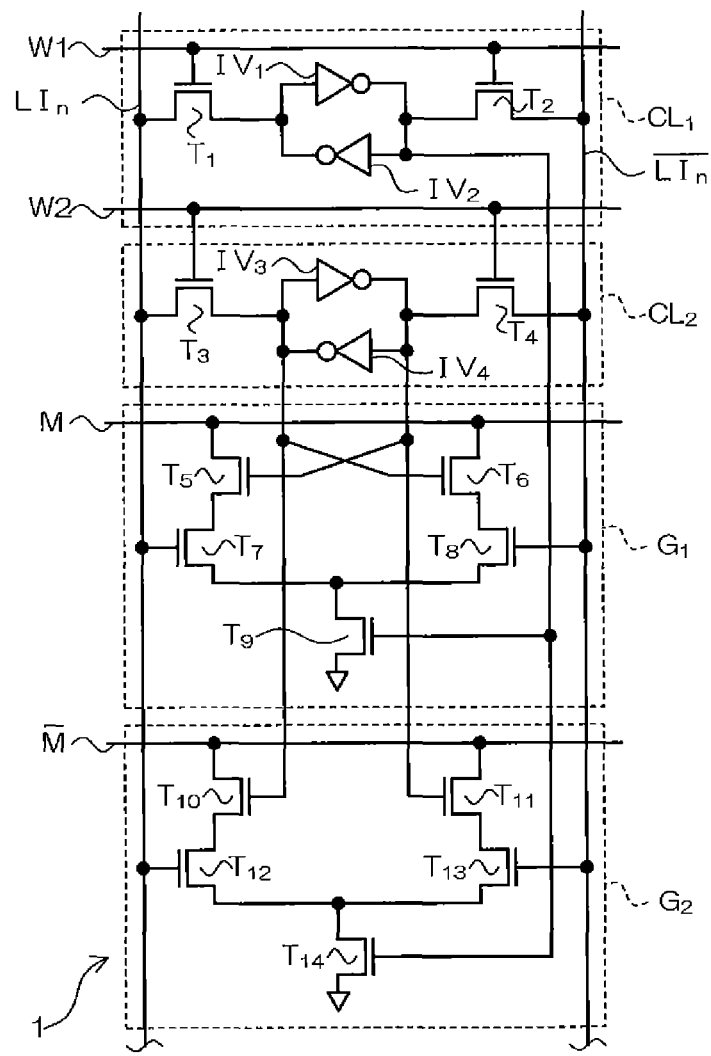
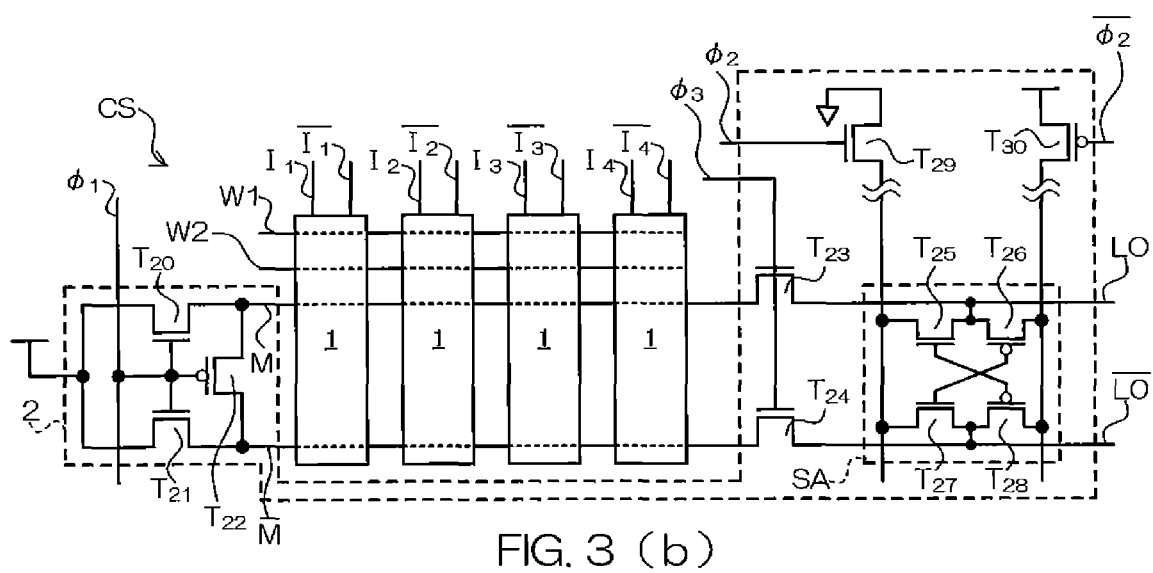
FIG. 3 (b)

SS1

CC1

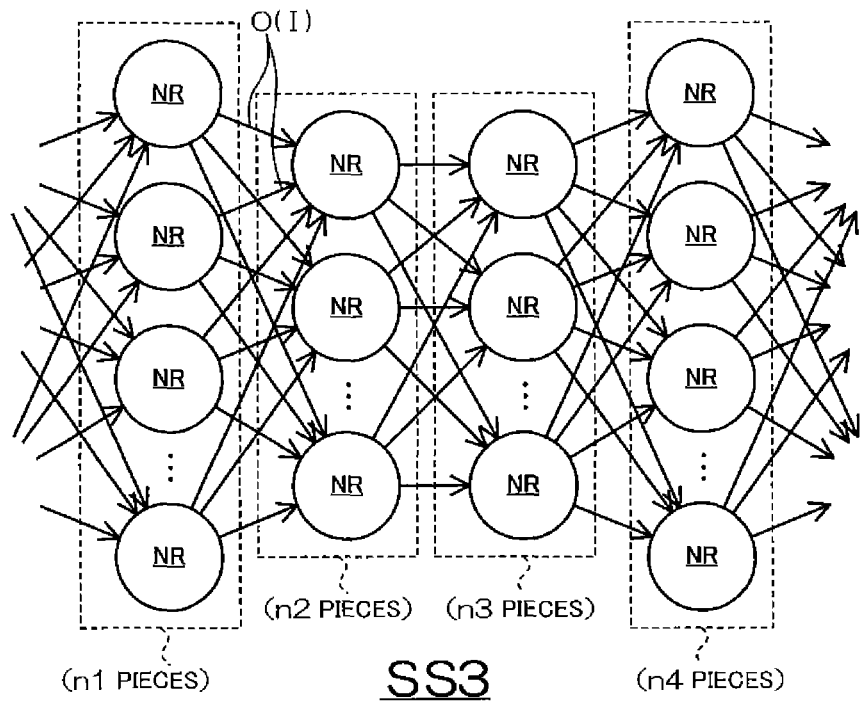
FIG. 7 (a)
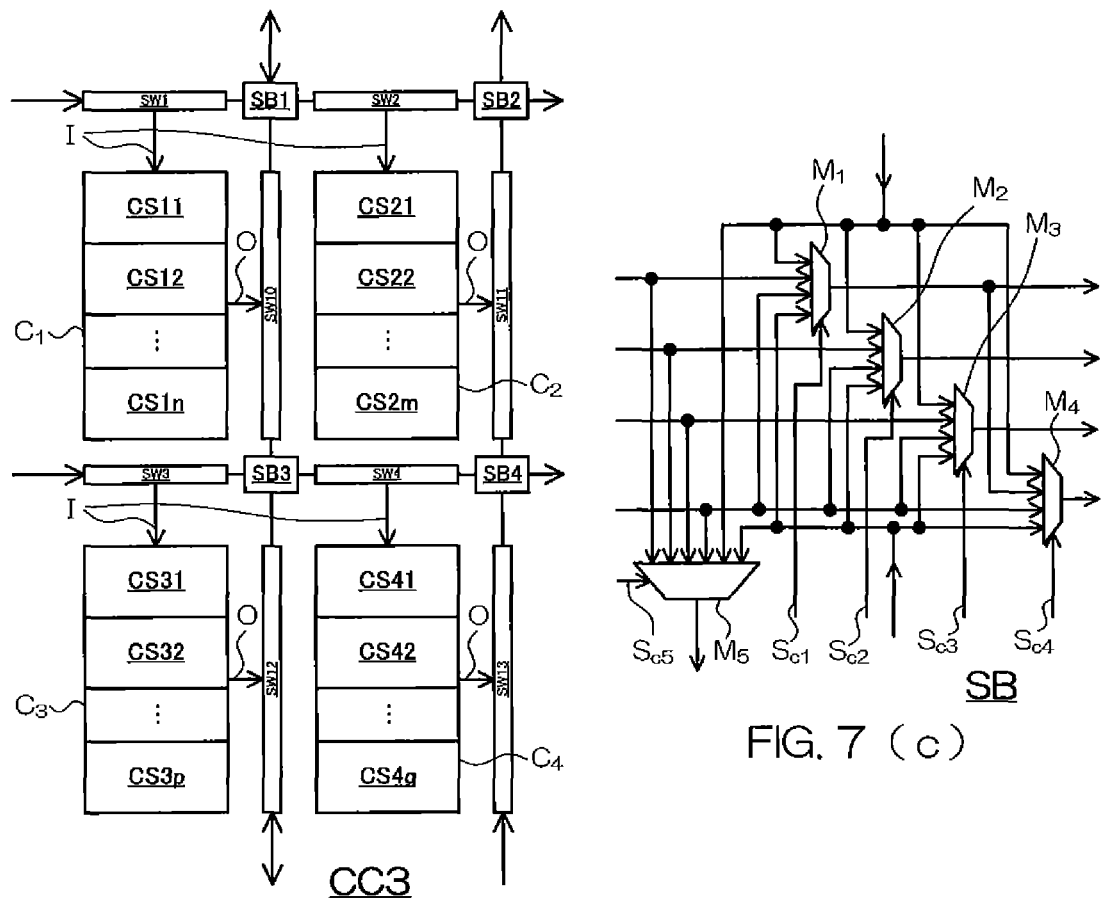
FIG. 7 (b)
FIG. 7 (c)

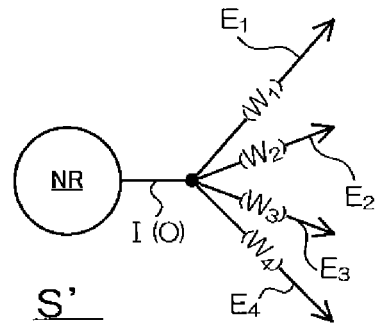
FIG. 8 (a)
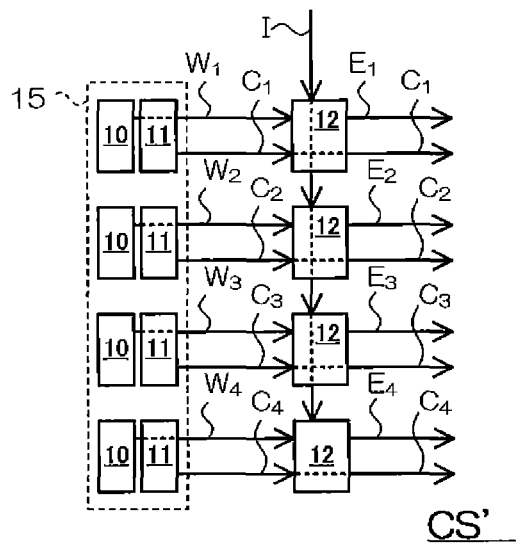
FIG. 8 (b)
| STORAGE VALUE(W) | INPUT DATA I | XOR | XNOR OUTPUT VALUE (E) |
|---|---|---|---|
| 0 | 0 | 0 | 1 |
| 0 | 1 | 1 | 0 |
| 1 | 0 | 1 | 0 |
| 1 | 1 | 0 | 1 |
FIG. 8 (c)

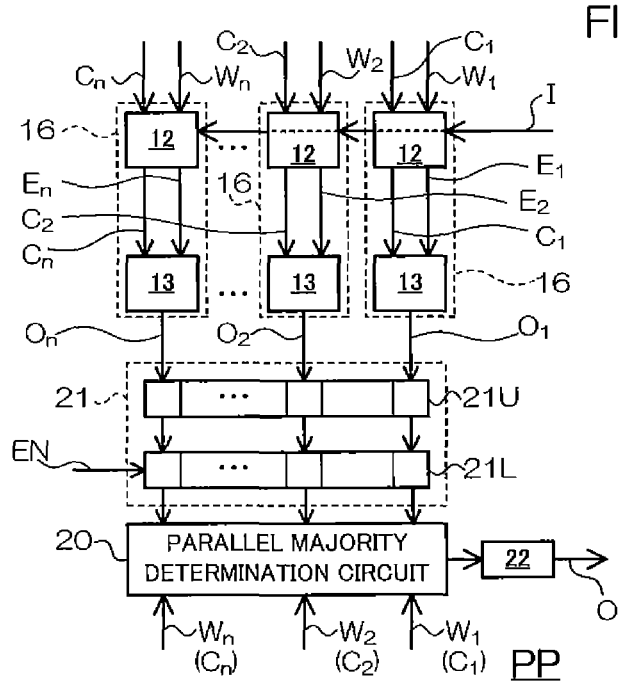
FIG. 14 (a)
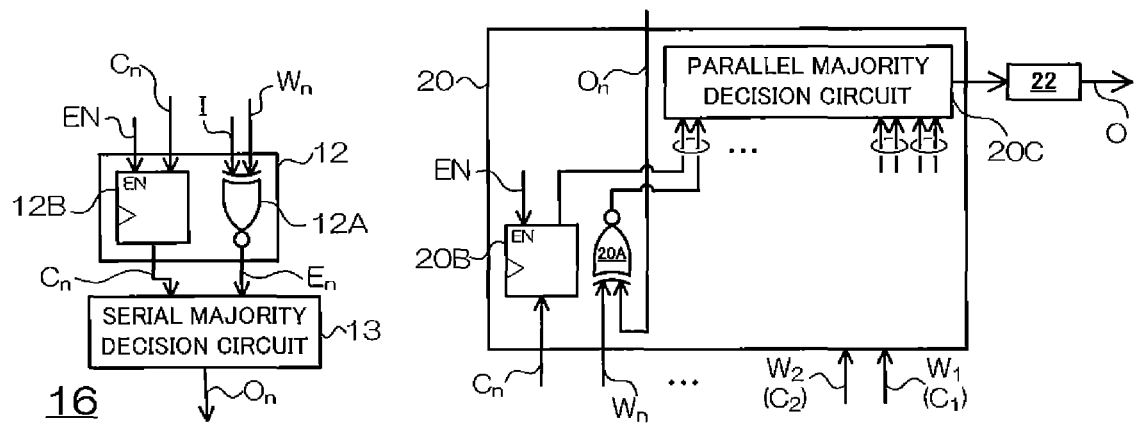
FIG. 14 (b)
FIG. 14 (c)
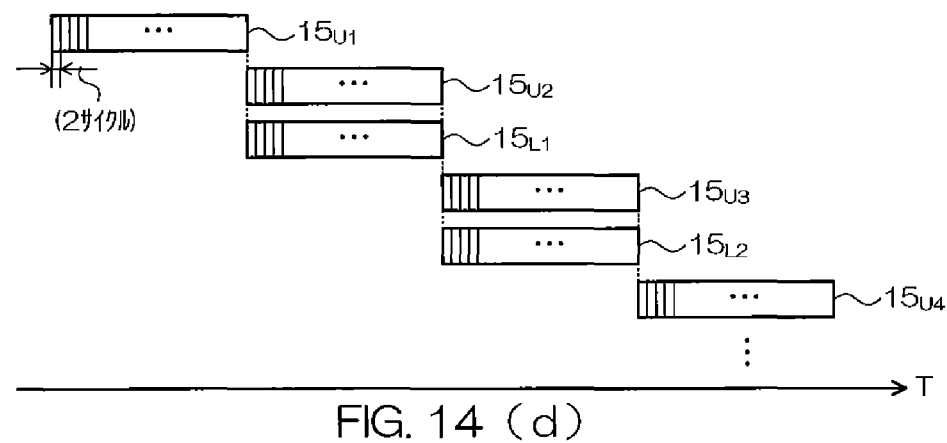
FIG. 14 (d)

$$OO = F(W_1 \times I_1 + W_2 \times I_2 + \cdots + W_n \times I_n + B_n) \quad \cdots (2)$$
PROVIDED THAT, $0 \leq B_n \leq N$ AND $B_n$ IS INTEGER

| TENDENCY COEFFICIENT | CONNECTION PRESENCE/ABSENCE INFORMATION | CONNECTION | OUTPUT DATA |
|---|---|---|---|
| 0 | 0 | NRR —(I×W)→ NRR | −1 OR 1 |
| 0 | 1 | NRR -------→ NRR | 0 |
| 1 | 0 | NRR —(I×W−1)→ NRR | −2 OR 0 |
| 1 | 1 | NRR —(I×W+1)→ NRR | 0 OR 2 |

NEURAL NETWORK CIRCUIT AND NEURAL NETWORK INTEGRATED CIRCUIT

TECHNICAL FIELD

The present invention relates to a neural network circuit and a neural network integrated circuit, and more particularly, to a neural network circuit having a multiplication function of multiplying a plurality of pieces of input data and a weighting coefficient, and an addition/application function of adding respective multiplication results, applying an activation function to the addition result, and outputting the resultant value, and a neural network integrated circuit including a plurality of the neural network circuits.

BACKGROUND ART

Recently, research and development on a so-called neural network circuit obtained by modeling a brain function of human beings has been in progress. At this time, a neural network circuit in the related art is realized, for example, by using a multiplication operation using a floating-point or a fixed-point in many cases, and in the cases, there is a problem such as a high operation cost and high processing load.

Here, recently, there is suggested an algorithm of a so-called "binary neural network circuit" in which the pieces of input data and the weighting coefficient are set to one bit respectively. Here, as the related art of the algorithm of the binary neural network circuit, for example, the following Non Patent Literature 1 and Non Patent Literature 2 can be exemplified.

CITATION LIST

Non Patent Document

Non Patent Document 1: Journal of "XNOR-Net: ImageNet Classification Using Binary Convolutional Neural Networks", Mohammad Rastegari et al., arXiv:1603.05279v2 [cs.CV, Apr. 19, 2016 (URL: 1495159321498_0.05279)

Non Patent Document 2: Journal of "Binarized Neural Networks: Training Neural Networks with Weights and Activations Constrained to +1 or −1", Matthieu Courbariaux et al., arXiv:1602.02830v3 [cs.LG], Mar. 17, 2016 (URL:1495159321498_1.02830)

SUMMARY OF THE INVENTION

Problem to be Solved by the Invention

However, any of the Non Patent Documents described above does not describe how to specifically realize the theory of the journals. In addition, it is desired to realize a parallel operation by using a great reduction in a unit operation cost by the theory described in each of the journals, but a hardware configuration therefore is not known. Further, there is room for investigation on how to realize a neural network circuit having various structures using the theory described in the journals.

Here, the invention has been made in consideration of the above-described problems and demands, and an object thereof is to provide an efficient and diverse neural network circuit while reducing a circuit scale and the cost corresponding to the circuit scale by using an algorithm of a binary neural network circuit, and a neural network integrated circuit including the neural network circuit.

Means for Solving the Problem

In order to achieve the above problem, an invention described in claim 1 is a neural network circuit comprising: a plurality of first circuit units which realize a multiplication function of multiplying one-bit input data and an one-bit weighting coefficient; and a second circuit unit that realizes addition/application function of adding multiplication results in the first circuit units, and outputs one-bit output data by applying an activation function to the addition result, wherein each of the first circuit units includes, a storage unit that stores any one of the weighting coefficient that is "1" or "0", or a predetermined value that is set in advance, and an output unit that outputs "1" at a timing corresponding to an input timing of the input data in a case where the weighting coefficient and a value of the input data match each other in a case where the weighting coefficient is stored in the storage unit, outputs "0" at the timing corresponding to the input timing of the input data in a case where the weighting coefficient and the value of the input data are different from each other, and outputs the predetermined value at the timing corresponding to the input timing of the input data in a case where the predetermined value is stored in the storage unit, and the second circuit unit outputs "1" or "0" as the output data on the basis of a difference between a total number of the first circuit units which output "1", and a total number of the first circuit units which output "0".

According to the invention described in claim 1, each of the first circuit units which realize the multiplication function of the neural network circuit comprises the storage unit that stores any one of the weighting coefficient that is "1" or "0" or the predetermined value, and the output unit that outputs "1" in a case where the value of the input data=the storage value, outputs "0" in a case where the value of the input data # the storage value, and outputs the predetermined value even in input data with any value in a case where the predetermined value is stored. On the other hand, the second circuit unit that realizes the addition/application function of the neural network circuit outputs "1" or "0" as the output data on the basis of a difference between a total number of the first circuit units which output "1", and a total number of the first circuit units which output "0". Accordingly, the multiplication function is realized by the plurality of first circuit units, each including the storage unit and the output unit, and the addition/application function is realized by the second circuit unit. Accordingly, it is possible to efficiently realize the neural network circuit while greatly reducing the circuit scale and the cost corresponding thereto.

In order to achieve the above problem, an invention described in claim 2 is the neural network circuit according to claim 1, wherein the second circuit unit outputs "1" as the output data in a case where the difference between the total number of the first circuit units which output "1" and the total number of the first circuit units which output "0" is equal to or greater than a threshold value that is determined in advance, and outputs "0" as the output data in a case where the difference is less than the threshold value.

According to the invention described in claim 2, in addition to the operation of the invention described in claim 1, the second circuit unit outputs "1" as the output data in a case where the difference between the total number of the first circuit units which output "1" and the total number of the first circuit units which output "0" is equal to or greater than a threshold value that is determined in advance, and outputs "0" as the output data in a case where the difference is less than the threshold value. Accordingly, it is possible to efficiently realize the neural network circuit while further reducing the circuit scale and the cost corresponding thereto.

In order to achieve the above problem, an invention described in claim 3 is the neural network circuit according to claim 2, wherein the neural network circuit comprises the same number of the first circuit units as the plurality of pieces of the input data, and the number of pieces of the input data and the number of the first circuit units are numbers that are set in advance on the basis of a brain function that is modeled by the neural network circuit.

According to the invention described in claim 3, in addition to the operation of the invention described in claim 2, the same number of the first circuit units as the plurality of pieces of the input data are comprised, and the number of pieces of the input data and the number of the first circuit units are numbers that are set in advance on the basis of a brain function that is modeled by the neural network circuit. Accordingly, it is possible to efficiently realize the neural network circuit that more accurately models the brain function.

In order to achieve the above problem, an invention described in claim 4 is a neural network integrated circuit comprising: m pieces of the neural network circuits (m is an integer of two or greater), in which the number of the first circuit units to which the input data is input respectively is n (n is an integer of two or greater), according to claim 3, wherein n pieces of the input data are commonly input to the neural network circuits in parallel, and the output data is output from the neural network circuits respectively.

According to the invention described in claim 4, m pieces of the neural network circuits, in which the number of the first circuit units is n, described in claim 3 are comprised, n pieces of the input data are commonly input to each of the neural network circuits in parallel, and the output data is output from the neural network circuits respectively. Accordingly, it is possible to efficiently realize n×m neural network integrated circuits with n-bit input and m-bit output while greatly reducing the circuit scale and the cost corresponding thereto.

In order to achieve the above problem, an invention described in claim 5 is a neural network integrated circuit comprising: a plurality of the neural network integrated circuits according to claim 4 in which n and m are equal to each other and which are connected in series, wherein the output data from one piece of the neural network integrated circuit is set as the input data in another neural network integrated circuit that is connected to be immediately subsequent to the neural network integrated circuit.

According to the invention described in claim 5, a plurality of the neural network integrated circuits described in claim 4, in which n and m are equal to each other, are connected in series, and the output data from one piece of the neural network integrated circuit is set as the input data in another neural network integrated circuit that is connected to be immediately subsequent to the neural network integrated circuit. Accordingly, it is possible to efficiently realize a neural network integrated circuit in which an input and an output are a parallel type while greatly reducing the circuit scale and the cost corresponding thereto.

In order to achieve the above problem, an invention described in claim 6 is a neural network integrated circuit comprising: k pieces of the neural network integrated circuits (k is a natural number of two or greater) according to claim 4, wherein n pieces of the input data are commonly input to each of the neural network integrated circuits in parallel, and m pieces of the output data are output from each of the neural network integrated circuits in parallel respectively.

According to the invention described in claim 6, k pieces of the neural network integrated circuits described in claim 4 are comprised, n pieces of the input data are commonly input to each of the neural network integrated circuits in parallel, and m pieces of the output data are output from each of the neural network integrated circuits in parallel. Accordingly, it is possible efficiently to realize a neural network integrated circuit in which an input and an output are a parallel type and the number of pieces of output data is greater than the number of pieces of input data while greatly reducing the circuit scale and the cost corresponding thereto.

In order to achieve the above problem, an invention described in claim 7 is a neural network integrated circuit comprising: a plurality of the neural network integrated circuits according to claim 4; and a switch unit which connects the neural network integrated circuits to each other in an array shape, and switches the input data and the output data with respect to the neural network integrated circuits, and in which a switching operation in the switch unit is set in advance in correspondence with the brain function.

According to the invention described in claim 7, a plurality of the neural network integrated circuits described in claim 4 are comprised, input data and output data with respect to each of the neural network integrated circuits are switched by the switch unit that connects each of the neural network integrated circuits in an array shape. In addition, a switching operation in the switch unit is set in advance in correspondence with the brain function. Accordingly, it is possible to efficiently realize a neural network integrated circuit having a large scale while greatly reducing the cost corresponding to the scale.

In order to achieve the above problem, an invention described in claim 8 is the neural network circuit according to claim 2, wherein the weighting coefficient is set in advance in correspondence with a brain function that is modeled by the neural network circuit, the storage unit includes, a first storage unit that stores the weighting coefficient and outputs the weighting coefficient to the output unit, and a second storage unit that stores the predetermined value set in advance in correspondence with the brain function, and outputs the predetermined value to the output unit, and the output unit outputs "1" at the timing corresponding to the input timing of the input data in a case where the weighting coefficient output from the first storage unit and the value of the input data match each other, outputs "0" at the timing corresponding to the input timing of the input data in a case where the weighting coefficient that is output and the value of the input data are different from each other, and outputs the predetermined value at the timing corresponding to the input timing of the input data in a case where the predetermined value is output from the second storage unit.

According to the invention described in claim 8, in addition to the operation of the invention described in claim 2, the multiplication function in the neural network circuits in correspondence with the brain function and to and from which one-bit input data is input and one-bit output data is output is realized by the first storage unit, the second storage unit, and the first circuit units. In addition, the addition/application function in the neural network circuit is realized by the second circuit unit. Accordingly, it is possible to efficiently realize a neural network circuit obtained by modeling the brain function of human beings while greatly reducing the circuit scale and the cost corresponding thereto.

In order to achieve the above problem, an invention described in claim 9 is the neural network circuit according to claim 8, wherein in a case where a tendency coefficient, which is set in advance in correspondence with the brain function and is an integer indicating a tendency as the brain function for every neuron, and of which an absolute value is equal to or greater than 0 and equal to or less than the number of pieces of the input data, is to be further added to an addition result of the multiplication results as an addition function in the addition/application function, the tendency coefficient is input, in a divided state, to any one of the first circuit units, the number of which is the same as an absolute value of the tendency coefficient, each of the first circuit units, to which the tendency coefficient is input in the divided state, outputs an additional addition result of the tendency coefficient with respect to the addition result of each of the multiplication results in correspondence with the predetermined value to the second circuit unit, and the second circuit unit outputs "1" as the output data when the sum value obtained by adding a plurality of the additional addition results of the tendency coefficient in each of the first circuit units is a positive value or 0, and outputs "0" as the output data when the sum value is a negative value.

According to the invention described in claim 9, in addition the operation of the invention described in claim 8, in a case where the predetermined tendency coefficient corresponding to the brain function is to be further added to an addition result of the multiplication results, the tendency coefficient is input, in a divided state, to any one of the first circuit units, the number of which is the same as an absolute value of the tendency coefficient. In addition, an additional addition result of the tendency coefficient with respect to the addition result of the multiplication results is output to the second circuit unit from the first circuit unit. According to this, "1" is output from the second circuit unit as the output data when the sum value obtained by adding a plurality of the additional addition results of the tendency coefficient in the first circuit units is a positive value or 0, and "0" is output from the second circuit unit as the output data when the sum value is a negative value. Accordingly, even in a case where the predetermined tendency coefficient based on the brain function is to be introduced, it is possible to efficiently realize a neural network circuit corresponding to the brain function of human beings while greatly reducing the circuit scale and the cost corresponding thereto.

In order to achieve the above problem, an invention described in claim 10 is the neural network circuit according to claim 8, further comprising: a tendency coefficient storage unit that stores a tendency coefficient, which is set in advance in correspondence with the brain function and is an integer indicating a tendency as the brain function for every neuron, and of which an absolute value is equal to or greater than 0 and equal to or less than the number of pieces of the input data, wherein the second circuit unit outputs "1" as the output data when the sum value obtained by further adding the tendency coefficient with respect to an addition result of the multiplication results from the first circuit units in correspondence with the predetermined value is positive value or 0, and outputs "0" as the output data when the sum value is a negative value.

According to the invention described in claim 10, in addition to the operation of the invention described in claim 8, a defined tendency coefficient corresponding to the brain function is stored, "1" is output from the second circuit unit as the output data when the sum value obtained by further adding the tendency coefficient with respect to an addition result of the multiplication results from each of the first circuit units in correspondence with the predetermined value is positive value or 0, and "0" is output as the output data when the sum value is a negative value. Accordingly, even in a case where the predetermined tendency coefficient based on the brain function is to be introduced, it is possible to efficiently realize a neural network circuit corresponding to the brain function of human beings while greatly reducing the circuit scale and the cost corresponding thereto.

In order to achieve the above problem, an invention described in claim 11 is the neural network circuit according to claim 8, wherein the number of pieces of the input data is one, the number of pieces of the output data, the number of the first storage units, the number of the second storage units, the number of the first circuit units, and the number of the second circuit units are numbers of two or greater which are set in advance in correspondence with the brain function, each of the weighting coefficient and the predetermined value are values which are set in advance in correspondence with the brain function, the output units of each of the first circuit units respectively output the multiplication result for every output data on the basis of the weighting coefficient and the input data which correspond to the output data, each of the second circuit units outputs "1" as the output data when a value obtained by subtracting a total number of the multiplication results which are "0" from a total number of the multiplication results which are "1" is equal to or greater than the threshold value in a case where the predetermined value is the value that is set in advance, and outputs "0" as the output data when the value obtained through the subtraction is less than the threshold value in a case where the predetermined value is the value that is set in advance.

According to the invention described in claim 11, in addition to the operation of the invention described in claim 8, the number of pieces of the input data is one, the number of pieces of the output data, the number of the first storage units, the number of the second storage units, the number of the first circuit units, and the number of the second circuit units are set to predetermined numbers of two or greater which correspond to the brain function. Each of the weighting coefficient and the predetermined value are set to values corresponding to the brain function. Then, each of the first circuit units respectively output the multiplication result for every output data on the basis of the weighting coefficient and the input data which correspond to each of the output data, and the second circuit units output "1" as the output data when (a total number of multiplication results of "1"−a total number of multiplication results of "0"≥a threshold value), and output "0" as the output data when (the total number of multiplication results of "1"−the total number of multiplication results of "0"<a threshold value). Accordingly, the multiplication function is realized by each of the first storage units, each of the second storage units, and each of the first circuit units for every output data, and the addition/application function is realized by each of the second circuit units for every output data. Accordingly, it is possible to efficiently realize a neural network circuit of a so-called serial-input and parallel-output type while greatly reducing the circuit scale and the cost corresponding thereto.

In order to achieve the above problem, an invention described in claim 12 is the neural network circuit according to claim 8, wherein the number of pieces of the output data and the number of the second circuit units are one, the number of pieces of the input data, the number of the first storage units, the number of the second storage units, and the number of the first circuit units are numbers of two or greater which are set in advance in correspondence with the brain function, each of the weighting coefficient and the predetermined value are values which correspond to the brain function, each of the first circuit units outputs each of the multiplication result for every input data on the basis of the weighting coefficient respectively corresponding to each of the input data and each of the input data, the second circuit units output "1" as the output data when a value obtained by subtracting a total number of the multiplication results which are "0" from a total number of the multiplication results which are "1" is equal to or greater than the threshold value in a case where the predetermined value is the value that is set in advance, and outputs "0" as the output data when the value obtained through the subtraction is less than the threshold value in a case where the predetermined value is the value that is set in advance.

According to the invention described in claim 12, in addition to the operation of the invention described in claim 8, the number of pieces of the output data and the number of the second circuit units are one respectively, and the number of pieces of the input data, the number of the first storage units, the number of the second storage units, and the number of the first circuit unit are respectively set to predetermined numbers of two or greater which correspond to the brain function. The weighting coefficient and the predetermined value are set to values corresponding to the brain function. Then, each of the first circuit units respectively output the multiplication result for every input data on the basis of the weighting coefficient corresponding to each of the input data and each of the input data, and the second circuit units output "1" as the output data when (a total number of multiplication results of "1"–a total number of multiplication results of "0"≥a threshold value), and output "0" as the output data when (the total number of multiplication results of "1"–the total number of multiplication results of "0"<a threshold value). Accordingly, the multiplication function is realized by each of the first storage units, each of the second storage units, and each of the first circuit units for every input data, and the addition/application function is realized by one piece of the second circuit unit for every input data. Accordingly, it is possible to efficiently realize a neural network circuit of a so-called parallel-input and serial-output type while greatly reducing the circuit scale and the cost corresponding thereto.

In order to achieve the above problem, an invention described in claim 13 is a neural network integrated circuit comprising: the neural network circuit according to claim 11; and the neural network circuit according to claim 12, wherein each of the output data output from the neural network circuit, to which one piece of input data is input, according to claim 11 is set as input data in the neural network circuit according to claim 12, and one piece of output data is output from the neural network circuit according to claim 12.

According to the invention described in claim 13, the neural network circuit according to claim 11, and the neural network circuit according to claim 12 are comprised, each of the output data output from the neural network circuit, to which one piece of input data is input, according to claim 11 is set as input data in the neural network circuit according to claim 12, and one piece of output data is output from the neural network circuit according to claim 12. Accordingly, the neural network circuit of the serial-input and parallel-output type according to this invention, and the neural network circuit of the parallel-input and the serial-output type according to this invention are connected to each other, and thus it is possible to efficiently realize a neural network circuit capable of corresponding to various brain functions while greatly reducing the circuit scale and the cost corresponding thereto.

In order to achieve the above problem, an invention described in claim 14 is the neural network integrated circuit according to claim 13, further comprising: a register unit provided between the neural network circuit according to claim 11 and the neural network circuit according to claim 12, wherein the register unit buffers the output data that is output from the neural network circuit according to claim 11 by one reference clock, and outputs the buffered data to the neural network circuit according to claim 12 as the input data in the neural network circuit according to claim 12.

According to the invention described in claim 14, in addition to the operation of the invention described in claim 13, each of the output data that is output from the neural network circuit according to claim 11 is buffered by one reference clock by the register unit comprised between the neural network circuit according to claim 11 and the neural network circuit according to claim 12, and each of the buffered data is output to the neural network circuit according to claim 12 as the input data in the neural network circuit according to claim 12. Accordingly, apparent parallel processing in the second operation unit in the neural network circuit according to claim 12 is possible, and thus it is possible to efficiently realize a neural network circuit capable of corresponding to various brain functions at a high speed.

In order to achieve the above problem, an invention described in claim 15 is a neural network integrated circuit comprising: a plurality of the neural network integrated circuits, which are connected in series, according to claim 13, wherein one piece of the output data from one of the neural network integrated circuits is set as one piece of the input data to a neural network integrated circuit in an immediately subsequent stage.

According to the invention described in claim 15, in addition to the operation of the invention described in claim 13, a plurality of the neural network integrated circuits according to claim 13 are connected in series, and one piece of the output data from one of the neural network integrated circuits is set as one piece of the input data to a neural network integrated circuit in an immediately subsequent stage. Accordingly, it is possible to efficiently realize a neural network circuit capable of corresponding to more various brain functions.

In order to achieve the above problem, an invention described in claim 16 is a neural network integrated circuit comprising: a plurality of the neural network integrated circuits according to claim 13, wherein one piece of the input data is commonly input to the plurality of neural network integrated circuits according to claim 13, and pieces of the output data are output one by one individually from the plurality of neural network integrated circuits according to claim 13.

According to the invention described in claim 16, in addition to the operation of the invention described in claim 13, one piece of the input data is commonly and respectively input to the plurality of neural network integrated circuits according to claim 13, and the output data is output one by one individually from the plurality of neural network integrated circuits according to claim 13. Accordingly, it is possible to realize a neural network circuit capable of corresponding to more various brain functions.

Effect of the Invention

According to this invention, each of the first circuit units which realize the multiplication function of the neural network circuit comprises the storage unit that stores any one of the weighting coefficient that is "1" or "0" or the predetermined value, and the output unit that outputs "1" in a case where the value of the input data=the storage value, outputs "0" in a case where the value of the input data # the storage value, and outputs the predetermined value even in input data with any value in a case where the predetermined value is stored. On the other hand, the second circuit unit that realizes the addition/application function of the neural network circuit outputs "1" or "0" as the output data on the basis of a difference between a total number of the first circuit units which output "1", and a total number of the first circuit units which output "0".

Accordingly, the multiplication function is realized by the plurality of first circuit units, each including the storage unit and the output unit, and the addition/application function is realized by the second circuit unit. Accordingly, it is possible to efficiently realize the neural network circuit corresponding to the brain function of human beings and an integrated circuit thereof while greatly reducing the circuit scale and the cost corresponding thereto.

BRIEF DESCRIPTION OF THE DRAWINGS

FIG. 2 is a diagram illustrating the neural network circuit according to the first embodiment, (a) is a diagram illustrating a neural network corresponding to the neural network circuit, (b) is a block diagram illustrating a configuration of the neural network circuit, and (c) is a truth table corresponding to the neural network circuit.

FIG. 3 is a diagram illustrating a detailed configuration of the neural network circuit according to the first embodiment, (a) is a diagram illustrating an example of a circuit of a memory cell relating to the detailed configuration, and (b) is a diagram illustrating an example of the circuit of the detailed configuration.

FIG. 7 is a diagram illustrating a fourth example of the neural network integrated circuit according to the first embodiment, (a) is a diagram illustrating a neural network corresponding to the fourth example, (b) is a block diagram illustrating a configuration of the fourth example, and (c) is a block diagram illustrating an example of a switch box according to the fourth example.

FIG. 8 is a diagram illustrating a part of a first example of a neural network integrated circuit according to a second embodiment, (a) is a diagram illustrating a neural network corresponding to the part, (b) is a block diagram illustrating a configuration of the part, and (c) is a truth table corresponding to the part.

FIG. 14 is a diagram illustrating a detailed configuration of a fourth example of the neural network integrated circuit according to the second embodiment, (a) is a diagram illustrating an example of a circuit of a pipeline register and the like according to the fourth example, (b) is a diagram illustrating an example of each of a majority determination input circuit and a serial majority determination circuit according to the fourth example, (c) is a diagram illustrating an example of a parallel majority determination circuit according to the fourth example, and (d) is a timing chart illustrating an operation in the fourth example.

FIG. 17 is a diagram illustrating a neural network according to a modification example, (a) is a diagram illustrating a unit in which one neuron is modeled according to the modification example, and (b) is a diagram illustrating a relationship between a tendency variable and output data according to the modification example and the like.

MODES FOR CARRYING OUT THE INVENTION

Next, a first embodiment and a second embodiment according to this invention will be respectively described with reference to the accompanying drawings. The following first embodiment and the like are embodiments and the like in a case where this invention is applied to a neural network circuit that realizes a neural network obtained by modeling a brain function of human beings by an electronic circuit.

(I) First Embodiment

Figure 1:
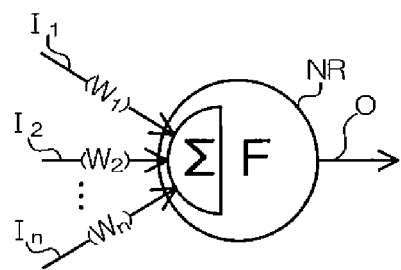
FIG. 1 is a diagram illustrating a neural network according to a first embodiment, (a) is a diagram illustrating a unit in which one neuron is modeled, and (b) is a diagram illustrating a state of a neural network formed by combining a plurality of the units.
Figure 1:
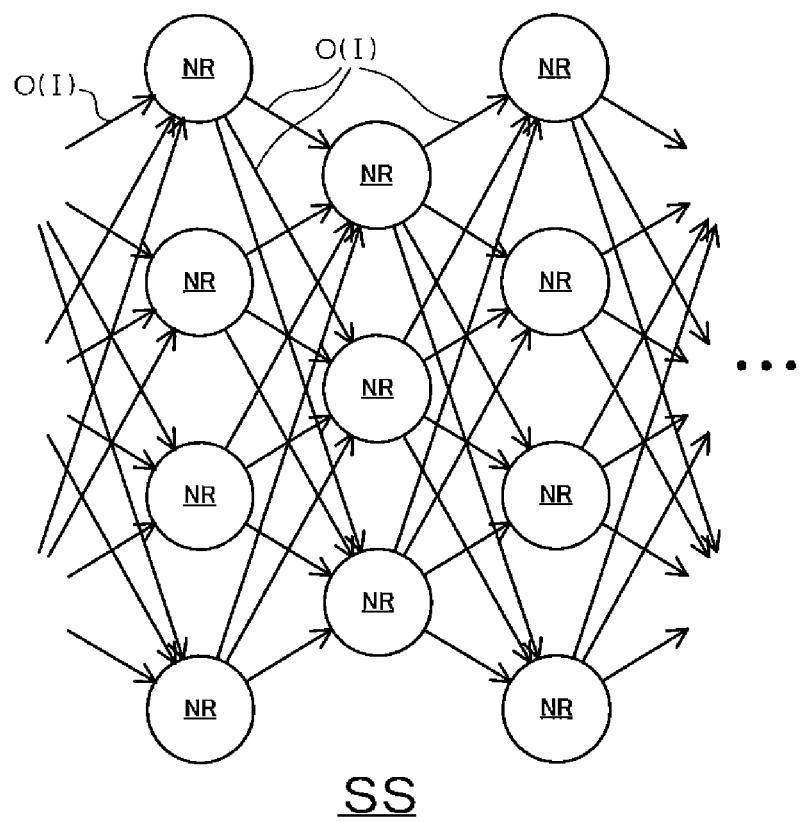
Figure 4:
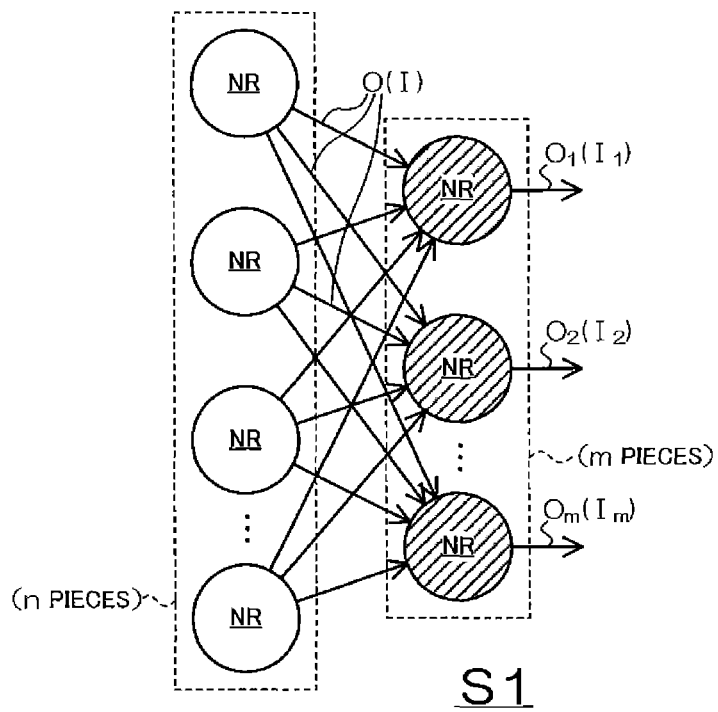
FIG. 4 is a diagram illustrating a first example of a neural network integrated circuit according to the first embodiment, (a) is a diagram illustrating a neural network corresponding to the first example, and (b) is a block diagram illustrating a configuration of the first example.
Figure 4:
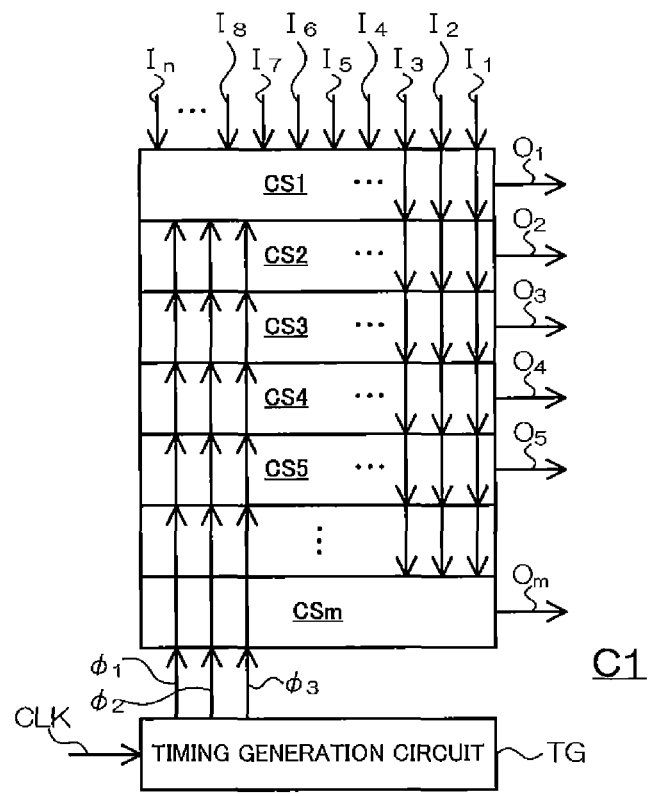
Figure 5:
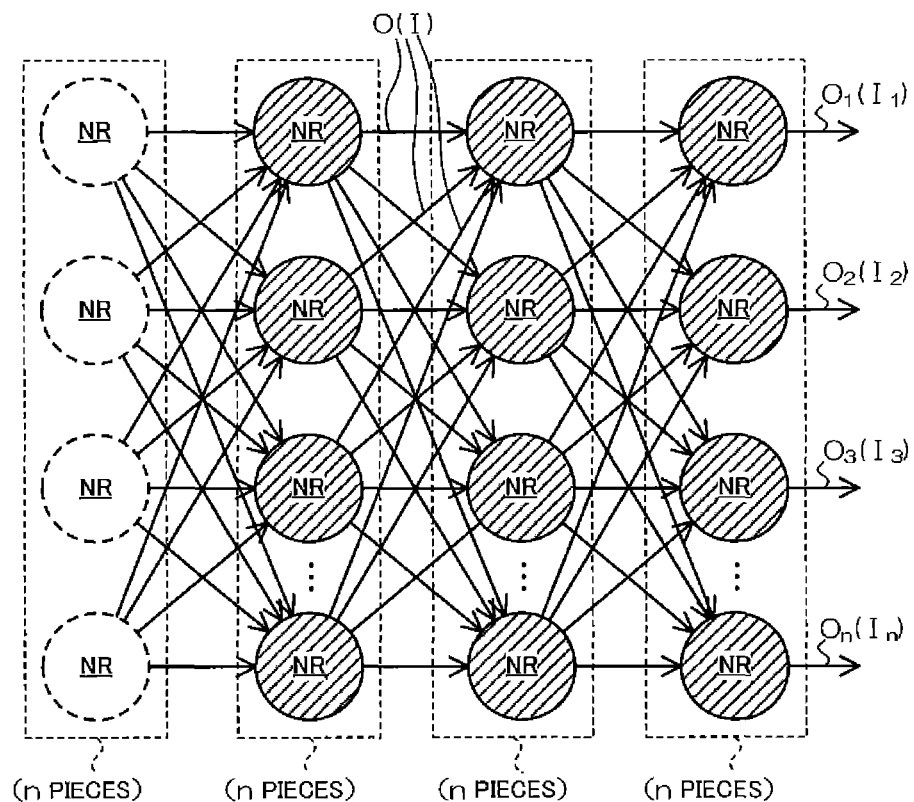
FIG. 5 is a diagram illustrating a second example of the neural network integrated circuit according to the first embodiment, (a) is a diagram illustrating a neural network corresponding to the second example, and (b) is a block diagram illustrating a configuration of the second example.
Figure 5:
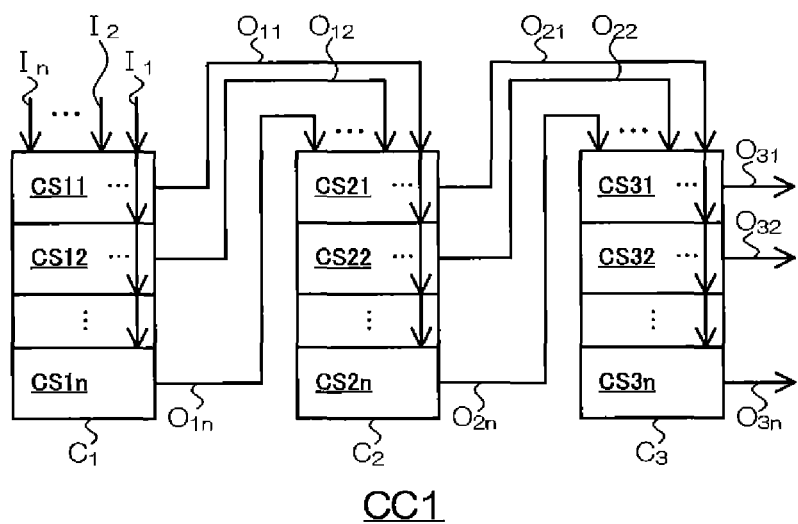
Figure 6:
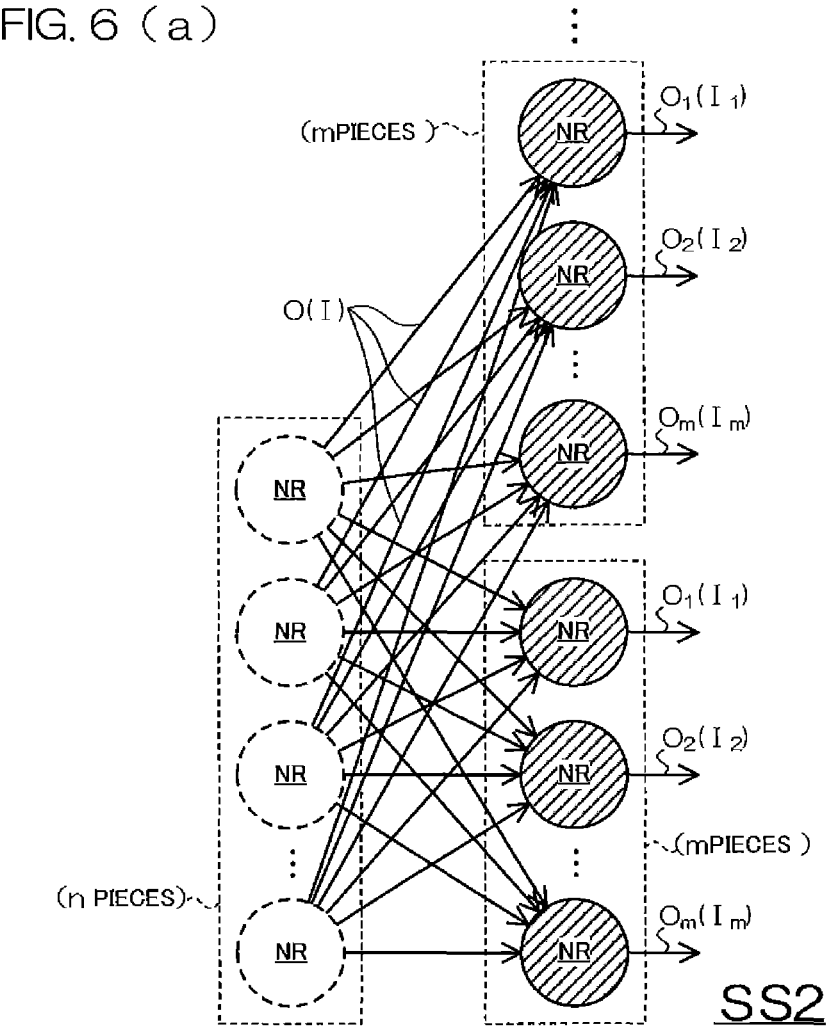
FIG. 6 is a diagram illustrating a third example of the neural network integrated circuit according to the first embodiment, (a) is a diagram illustrating a neural network corresponding to the third example, and (b) is a block diagram illustrating a configuration of the third example.
Figure 6:
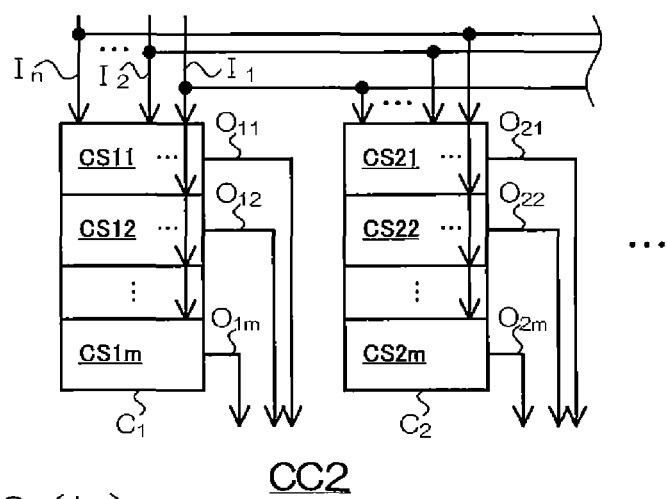

First, the first embodiment according to this invention will be described with reference to FIG. 1 to FIG. 7. Furthermore, FIG. 1 is a diagram illustrating a neural network according to the first embodiment, FIG. 2 is a diagram illustrating a neural network circuit according to the first embodiment, and FIG. 3 is a diagram illustrating a detailed configuration of the neural network circuit. In addition, FIG. 4 is a diagram illustrating a first example of a neural network integrated circuit according to the first embodiment, FIG. 5 is a diagram illustrating a second example of the neural network integrated circuit, FIG. 6 is a diagram illustrating a third example of the neural network integrated circuit, and FIG. 7 is a diagram illustrating a fourth example of the neural network integrated circuit.

(A) with Regard to Neural Network

First, the neural network obtained by modeling the above-described brain function will be described with reference to FIG. 1 in general.

In general, it is said that a plurality of neurons (neuron cells) exist in a brain of the human beings. In the brain, each of the neurons receives an electric signal from a plurality of other neurons, and transmits an electric signal to a plurality of still other neurons. In addition, the brain performs various kinds of information processing by flows of these electric signals between the neurons. At this time, transmission and reception of an electric signal between the neurons are performed through a cell that is called a synapse. In addition, the neural network is configured to realize the brain function in a computer by modeling the above-described transmission and reception of an electric signal between the neurons in the brain.

More specifically, in the neural network, as illustrated in FIG. 1(a), the above-described transmission and reception of the electric signal with respect to one neuron in the brain function is modeled by executing multiplication processing, addition processing, and activation function application processing with respect to each of a plurality of pieces of input data $I_1$, input data $I_2$, ..., and input data $I_n$ (n is a natural integer. The same shall apply hereinafter) which are input from an outer side in one neuron NR, and by setting the result as output data O. Furthermore, in the following description, the above-described activation function application processing is simply referred to as "activation processing". At this time, in one neuron NR, the above-described multiplication processing is executed by multiplying the plurality of pieces of input data $I_1$, input data $I_2$, ..., and input data $I_n$ by a weighting coefficient $W_1$, a weighting coefficient $W_2$, ..., and a weighting coefficient $W_n$ which are set in advance (that is, predetermined) in correspondence with the plurality of input data $I_1$, input data $I_2$, ..., and input data $I_n$. Then, the neuron NR executes the above-described addition processing of adding results of the above-described multiplication processing with respect to the respective pieces of input data $I_1$, input data $I_2$, ..., and input data $I_n$. Then, next, the neuron NR executes the above-described activation processing of applying a predetermined activation function F to the result of the above-described addition processing, and outputs the result to another one or a plurality of neurons NR as the above-described output data O. When expressing the above-described series of multiplication processing, the addition processing, and the activation processing with a mathematical formula, the following Expression (1) as illustrated in FIG. 1(a) is obtained. At this time, the multiplication processing of multiplying the input data $I_1$, input data $I_2$, ..., and input data $I_n$ by the weighting coefficient $W_1$, the weighting coefficient $W_2$, ..., and the weighting coefficient $W_n$ corresponds to an operation of the synapse in the exchange of the above-described electric signal between neurons NR. In addition, as illustrated in FIG. 1(b), when a plurality of the neurons NR illustrated in FIG. 1(a) are collected and connected to each other by the synapse, the entirety of the brain is modeled as a neural network SS. Furthermore, in the following description, in a case of describing a common configuration of the input data $I_1$ to the input data $I_n$ or input data $I_m$ (m is an integer. The same shall apply hereinafter), they are simply referred to as "input data I". Similarly, in a case of describing a common configuration of the output data $O_1$ to the output data $O_n$ or the output data $O_m$, they are simply referred to as "output data O". In addition, in a case of describing a common configuration of the weighting coefficient $W_1$ to the weighting coefficient $W_n$ or the weighting coefficient $W_m$, they are simply referred to as "weighting coefficient W".

In addition, the neural network circuit or the neural network integrated circuit according to the first embodiment and the like are obtained by modeling a general neural network described with reference to FIG. 1 by a neural network circuit or a neural network integrated circuit which are binarized by the method described in Non Patent Document 1 or Non Patent Document 2.

(B) With Regard to Neural Network Circuit According to First Embodiment

Next, the neural network circuit according to the first embodiment will be described with reference to FIG. 2 and FIG. 3.

As illustrated in FIG. 2(a), in a neural network S corresponding to the neural network circuit, for example, one-bit input data I is respectively input to one neuron NR from four different neurons NR, and output data O corresponding to the input data I is output from the neuron NR. At this time, the input data I becomes one-bit output data O in terms of the neuron NR that is an output source of the input data I. In addition, the one-bit output data O becomes one-bit input data I in terms of the neuron NR that is an output destination of the output data O. As described above, the input data I and the output data O are set to one bit, and thus any of a value of the input data I and a value of the output data O is either "0" or "1". In addition, in FIG. 2(a), Expression (1) corresponding to the multiplication processing that is executed in the neuron NR (indicated by hatching in FIG. 2(a)) to which four pieces of input data I are input is an expression in a case where which n is set to 4 in Expression (1). That is, the neural network S is a one-stage neural network of a parallel multi-input and one-output type.

Next, a configuration of the neural network circuit according to the first embodiment corresponding to the neuron NR indicated by hatching in the neural network S as illustrated in FIG. 2(a) is illustrated as a neural network circuit CS in FIG. 2(b). The neural network circuit CS is composed of four memory cells 1 respectively corresponding to one-bit input data $I_1$ to one-bit input data $I_4$, and a majority determination circuit 2. At this time, each of the memory cells 1 corresponds to an example of a "first circuit unit", an example of a "storage unit", and an example of an "output unit" according to this invention. In addition, the majority determination circuit 2 corresponds to an example of a "second circuit unit" according to this invention. In this configuration, each of the memory cells 1 stores any one of three predetermined values representing "1", "0", and "Not Connected (NC)" as a storage value, and is a three-value memory cell having a comparison function. In addition, the memory cells 1 respectively output data $E_1$ to output data $E_4$ having values corresponding to values of pieces of input data I and respective storage values to the majority determination circuit 2.

Here, the above-described "NC" indicated by the above-described predetermined value that is one of the storage values of the memory cells 1 represents a state in which connection is not established between two neurons NR in the neural network S according to the first embodiment. That is, in a case where two neurons NR (that is, an input neuron and an output neuron) to which the memory cells 1 correspond are not connected to each other, storage values of the memory cells 1 are set to the predetermined values. On the other hand, whether to store any one ("1" or "0") of different storage values of the memory cells 1 to the memory cells 1 is set on the basis of a weighting coefficient W in connection between two neurons NR which are connected to each other through the connection to which the memory cells 1 correspond. Here, whether to store which storage value in the memory cells 1 is set in advance on the basis of whether to model which brain function as the neural network S (more specifically, for example, a connection state between neurons NR which constitute the neural network S) and the like. Furthermore, in the following description, in a case of describing a common configuration, the output data $E_1$ to the output data $E_n$ are simply referred to as "output data E".

In addition, a relationship between the above-described storage value in each of the memory cells 1 and the value of the input data I that is respectively input to the memory cell 1, and the value of the output data E that is output from each of the memory cell 1 is set to a relationship illustrated in a truth table in FIG. 2(c). That is, the memory cell 1 outputs an exclusive NOR between the storage value of the memory cell 1 and the input data I from the memory cell 1 as the output data E. In addition, in a case where the storage value of the memory cell 1 is the above-described predetermined value, the predetermined value is output from the memory cell 1 to the majority determination circuit 2 as the output data E even when the input data I is any value. Furthermore, a detailed configuration of each of the memory cell 1 will be described later with reference to FIG. 3(a).

Next, on the basis of the value of the output data E from each of the memory cell 1, the majority determination circuit 2 outputs the output data O with a value of "1" only in a case where the number of pieces of the output data E with a value of "1" is greater than the number of pieces of the output data E with a value of "0", and outputs the output data O with a value of "0" in the other cases. At this time, specific examples of a case other than the case where the number of pieces of the output data E with the value of "1" is greater than the number of pieces of the output data E with the value of "0" is a case where the value of "NC" is output from any one of the memory cells 1, or a case where the number of pieces of the output data E with the value of "1" from each of the memory cells 1 is equal to or less than the number of pieces of the output data E with the value of "0". Furthermore, a detailed configuration of the neural network circuit CS including the majority determination circuit 2 and each of the memory cells 1 will be described later with reference to FIG. 3(b).

Here, as described above, the neural network circuit CS is a circuit obtained by modeling the multiplication processing, the addition processing, and the activation processing in the neuron NR indicated by hatching in FIG. 2(a). In addition, outputting of the output data E from each of the memory cells 1 as the exclusive NOR corresponds to the multiplication processing using the weighting coefficient W. In addition, as an assumption of comparison processing of comparing the number of pieces of the output data E with the value of "1" and the number of pieces of the output data E with the value of "0", the majority determination circuit 2 adds the number of pieces of the output data E with the value of "1" to calculate the sum value, and adds the number of pieces of the output data E with the value of "0" to calculate the sum value. These additions correspond to the addition processing. In addition, the sum value of the number of pieces of the output data E with the value of "1" and the sum value of the number of pieces of the output data E with the value of "0" are respectively compared with each other in the majority determination circuit 2, and only in a case where a value obtained by subtracting the latter value from the former value is equal to or greater than a majority determination threshold value that is set in advance, the output data O with the value of "1" is output from the majority determination circuit 2. On the other hand, in another case, that is, in a case where the value obtained by subtracting the sum value of the number of pieces of the output data E with the value of "0" from the sum value of the number of pieces of output data E with the value of "1" is less than the majority determination threshold value, the output data O with the value of "0" is output from the majority determination circuit 2. At this time, in a case where the output data E is the predetermined value, the majority determination circuit 2 does not add the output data E to any of the number of pieces of the output data E with the value of "1", and the number of pieces of the output data E with the value of "0".

Here, the processing using the majority determination threshold value in the majority determination circuit 2 will be described in more detail. Furthermore, in the neural network circuit CS illustrated in FIG. 2, a total number of the number of pieces of the output data E with the value of "1" and the number of pieces of the output data E with the value of "0" is "4", but description will be given of the above-described processing in a case where the total number is "10" for clarification of description.

That is, for example, when assuming that the majority determination threshold value is "0", the number of pieces of the output data E with the value of "1" is "5", and the number of pieces of the output data E with the value of "0" is "5", a value obtained by subtracting the number of pieces of the output data E with the value of "0" from the number of pieces of the output data E with the value of "1" is "0" and is the same as the majority determination threshold value. Accordingly, in this case, the majority decision determination circuit 2 outputs output data O with a value of "1". In contrast, when assuming that the majority determination threshold value is "0", the number of pieces of the output data E with the value of "1" is "4", and the number of pieces of the output data E with the value of "0" is "6", a value obtained by subtracting the number of pieces of the output data E with the value of "0" from the number of pieces of the output data E with the value of "1" is "−2" and is less than the majority determination threshold value. Accordingly, in this case, the majority decision determination circuit 2 outputs output data O with a value of "0".

On the other hand, for example, when assuming that the majority determination threshold value is "−2", the number of pieces of the output data E with the value of "1" is "5", and the number of pieces of the output data E with the value of "0" is "5", a value "0" obtained by subtracting the number of pieces of the output data E with the value of "0" from the number of pieces of the output data E with the value of "1" is greater than the majority determination threshold value. Accordingly, in this case, the majority decision determination circuit 2 outputs output data O with the value of "1". In contrast, when assuming that the majority determination threshold value is "−2", the number of pieces of the output data E with the value of "1" is "4", and the number of pieces of the output data E with the value of "0" is "6", a value "−2" obtained by subtracting the number of pieces of the output data E with the value of "0" from the number of pieces of the output data E with the value of "1" is the same as the majority determination threshold value. Accordingly, also in this case, the majority decision determination circuit 2 outputs output data O with the value of "1".

The processing in the majority determination circuit 2 described above in detail corresponds to the activation processing. As described above, each of the processing as the neuron NR indicated by hatching in FIG. 2(a) is modeled by the neural network circuit CS illustrated in FIG. 2(b).

Next, a detailed configuration of the memory cells 1 will be described with reference to FIG. 3(a). As illustrated in FIG. 3(a), each of the memory cells 1 respectively is composed of a transistor $T_1$ to a transistor $T_{14}$, and an inverter $IV_1$ to an inverter $IV_4$. Furthermore, for example, each of the transistors $T_1$ and the like illustrated in FIG. 3 is constituted by a metal oxide semiconductor field effect transistor (MOSFET) or the like. In addition, these elements are connected by a connection line $LI_n$ and a connection line $/LI_n$ which correspond to the input data $I_n$, a connection line W1 and a connection line W2 which correspond to a word signal, and a match line M and an inverted match line /M which correspond to a match signal in an aspect illustrated in FIG. 3(a) to constitute one of the memory cells 1. At this time, one memory $CL_1$, for example, as a static random access memory (SRAM) is constituted by the transistor $T_1$ and the transistor $T_2$, and the inverter $IV_1$ and the inverter $IV_2$, and one memory $CL_2$, for example, as the SRAM is constituted by the transistor $T_3$ and the transistor $T_4$, and the inverter $IV_3$ and the inverter $IV_4$. In addition, an XNOR gate $G_1$ is constituted by the transistor $T_5$ to the transistor $T_9$, and an XOR gate $G_2$ is constituted by the transistor $T_{10}$ to the transistor $T_{14}$.

Next, a detailed configuration of the neural network circuit CS including the majority determination circuit 2 and each of the memory cells 1 will be described with reference to FIG. 3(b). Furthermore, FIG. 3(b) illustrates a detailed configuration of the neural network circuit CS in which the number of pieces of input data I is four (that is, comprising four memory cells 1) in correspondence with FIG. 2(a). In addition, in the neural network circuit CS illustrated in FIG. 3(b), description will be given of a case where the majority determination threshold value is "0".

As illustrated in FIG. 3(b), the neural network circuit CS is composed of four memory cells 1, and a transistor $T_{20}$ to a transistor $T_{30}$ (refer to a broke line in FIG. 3(b)) which constitute the majority determination circuit 2. At this time, as indicated by a one-dot chain line in FIG. 3(b), a flip-flop type sense amplifier SA is constituted by the transistor $T_{25}$ to the transistor $T_{28}$. In addition, these elements are connected by the connection line W1, the connection line W2, the match line M, and the inverted match line /M which are common to the four memory cells 1, and a connection line LO and a connection line /LO which correspond to the output data O in an aspect illustrated in FIG. 3(b) to constitute one neural network circuit CS. In addition, to the neural network circuit CS illustrated in FIG. 3(b), a timing signal $\phi_1$, a timing signal $\phi_2$, a timing signal $/\phi_2$, and a timing signal $\phi_3$, which are set in advance to define processing as the neural network circuit CS, are input from the outside. At this time, the timing signal $\phi_1$ is respectively input to gate terminals of the transistor $T_{20}$ to the transistor $T_{22}$, the timing signal $\phi_2$ and the timing signal $/\phi_2$ are respectively input to gate terminals of the transistor $T_{29}$ and the transistor $T_{30}$, and the timing signal $\phi_3$ is respectively input to gate terminals of the transistor $T_{23}$ and the transistor $T_{24}$. In this configuration, in the match line M and the inverted match line /M of each of the memory cells 1 pre-charged on the basis of the timing signal $\phi_1$, in correspondence with a value of the input data I, and storage values of the memory $CL_1$ and the memory $CL_2$, timing at which precharged charges are extracted is different. In addition, the sense amplifier SA detects that the precharged charges are to be extracted earlier from either the match line M or the inverted match line /M, amplifies a voltage difference between the match line M and the inverted match line /M, and outputs the detection result to the connection line LO to the connection line /LO. Here, when a value of the connection line LO is "1", this represents the value "1" of the output data O as the neural network circuit CS. According to the above-described configuration and the operation, the neural network circuit CS executes processing that models the processing as the neuron NR indicated by hatching in FIG. 2(a) on the basis of the timing signal $\phi_1$ and the like, and outputs the output data O.

(C) With Regard to First Example of Neural Network Integrated Circuit According to First Embodiment Next, a first example of the neural network integrated circuit according to the first embodiment will be described with reference to FIG. 4. Furthermore, in FIG. 4, the same reference numeral will be given to the same constituent member as in the neural network circuit described with reference to FIG. 2 and FIG. 3 according to the first embodiment, and detailed description thereof will be omitted.

The following neural network integrated circuit described with reference to FIG. 4 to FIG. 7 according to the first embodiment is an integrated circuit in which a plurality of the neural network circuits described with reference to FIG. 2 and FIG. 3 according to the first embodiment are integrated. In addition, these neural network integrated circuits are configured to model a complicated neural network including a more lot of neurons NR.

First, a first example of the neural network integrated circuit for modeling a neural network S1 illustrated in FIG. 4(a) according to the first embodiment will be described. The neural network S1 is a neural network in which one-bit output data O is respectively output to each of m pieces of neurons NR indicated by hatching in FIG. 4(a) from n pieces of neurons NR, and one-bit output data O is respectively output from the neurons NR indicated by hatching. That is, the neural network S1 is a one-stage neural network of a parallel multi-input and parallel multi-output type. Here, FIG. 4(a) illustrates a case where the entirety of the neurons NR are connected by an input signal I or an output signal O, but any one connection between the neurons NR may not be established in correspondence with a brain function to be modeled. In addition, this situation is expressed by the predetermined value that is stored as a storage value of the memory cells 1 corresponding to the connection between the neurons NR which are not connected to each other. Furthermore, this is also true of a case of a neural network to be described later with reference to FIG. 5(a), FIG. 6(a), or FIG. 7(a) respectively.

In a case of modeling the neural network S1, in the neural network circuit CS described with reference to FIG. 2 and FIG. 3 according to the first embodiment, it is assumed that the number of pieces of one-bit input data I is set to "n". At this time, each of neural network circuits CS, to which the n pieces of input data I are input, has a configuration of modeling the function of the neuron NR indicated by hatching in FIG. 4(a), and executes the above-described multiplication processing, the addition processing, and the activation processing respectively. Furthermore, in the following description with reference to FIG. 4 to FIG. 7, the neural network circuits CS to which the n pieces of input data I are input are referred to as "neural network circuit CS1", "neural network circuit CS2", . . . . In addition, as the first example of the neural network integrated circuit according to the first embodiment, m pieces of the neural network circuits CS1 to which the n pieces of input data I are input, and the like are integrated.

That is, as illustrated in FIG. 4(b), a neural network integrated circuit C1 that is a first example of the neural network integrated circuit according to the first embodiment has a configuration in which m pieces of neural network circuits CS1 to CSm, to which n pieces of one-bit input data $I_1$ to $I_n$ are commonly input, are integrated. In addition, the timing signal $\phi_1$ and the like are commonly input to each of the neural network circuit CS1 to the neural network circuit CSm from a timing generation circuit TG. At this time, the timing generation circuit TG generates the timing signal $\phi_1$ and the like on the basis of a reference clock signal CLK that is set in advance, and outputs the timing signal $\phi_1$ and the like to the neural network circuit CS1 to the neural network circuit CSm. In addition, the neural network circuit CS1 to the neural network circuit CSm respectively output a one-bit output data $O_1$, a one-bit output data $O_2$, . . . , and a one-bit output data $O_m$ on the basis of the above-described input data $I_1$ to the input data $I_n$, the timing signal $\phi_1$, and the like.

In the neural network integrated circuit C1 having the above-described configuration, the output data O is output to m pieces of neurons NR from n pieces of neurons NR, and thus the neural network S1 in FIG. 4(a), in which a total of m pieces of output data O are output from the m pieces of neurons NR, is modeled.

(D) With Regard to Second Example of Neural Network Integrated Circuit According to First Embodiment Next, a second example of the neural network integrated circuit according to the first embodiment will be described with reference to FIG. 5. Furthermore, in FIG. 5, the same reference numeral will be given to the same constituent member as in the neural network circuit described with reference to FIG. 2 and FIG. 3 according to the first embodiment, and detailed description thereof will be omitted.

The second example of the neural network integrated circuit according to the first embodiment is a neural network integrated circuit for modeling a neural network SS1 illustrated in FIG. 5(a). The neural network SS1 corresponds to a case where n is set to m in the neural network S1 described with reference to FIG. 4(a). That is, the neural network SS1 is a neural network in which output data O is output to each of 3×n pieces of neurons NR indicated by hatching in FIG. 5(a) from (n pieces of) neurons NR in an adjacent column, and therefore the output data O is output from each of n pieces of neurons NR of a right end column in FIG. 5(a). The above-described neural network SS1 is a neural network of a parallel multi-input and parallel multi-output type.

Even in a case of modeling the neural network SS1, as in the neural network S1 described with reference to FIG. 4, in the neural network circuit CS described with reference to FIG. 2 and FIG. 3 according to the first embodiment, it is assumed that the number of pieces of the one-bit input data I is set to "n". At this time, each of neural network circuits CS, to which the n pieces of input data I are input, has a configuration of modeling the function of the neuron NR indicated by hatching in FIG. 5(a), and executes the above-described multiplication processing, the addition processing, and the activation processing. In addition, as the second example of the neural network integrated circuit according to the first embodiment, a total of 3×n pieces of neural network circuits are integrated by connecting in series neural network circuit CS11 and the like to which n pieces of input data I are input.

That is, as illustrated in FIG. 5(b), in a neural network integrated circuit CC1 that is the second example of the neural network integrated circuit according to the first embodiment, n pieces of neural network circuits CS11 to CS1n, to which n pieces of one-bit input data $I_1$ to $I_n$ are commonly input, are integrated to constitute one neural network integrated circuit C1 (refer to FIG. 4(b)). In addition, each of the neural network circuit CS11 to the neural network circuit CS1n, which constitute the neural network integrated circuit C1, respectively output one-bit output data $O_{11}$ to one-bit output data $O_{1n}$, and the pieces of output data are commonly input to n pieces of neural network circuits CS21 to CS2n in a next stage. Another one neural network integrated circuit C2 is constituted by these neural network circuit CS21 to the neural network circuit CS2n. In addition, each of the neural network circuit CS21 to the neural network circuit CS2n, which constitute the neural network integrated circuit C2, respectively output one-bit output data $O_{21}$ to one-bit output data $O_{2n}$, and the pieces of output data are commonly input to n pieces of neural network circuits CS31 to CS3n in a next stage. Still another one neural network integrated circuit C3 is constituted by these neural network circuit CS31 to the neural network circuit CS3n. Here, as in the case illustrated in FIG. 4(a), the timing signal $\phi_1$ and the like are commonly input to the neural network circuit CS11 and the like, but description thereof is omitted in FIG. 5(b) for simplification of explanation. In addition, the neural network integrated circuit C1 generates output data $O_{11}$, output data $O_{12}$, . . . , and output data $O_{1n}$, respectively, on the basis of the input data $I_1$ to the input data $I_n$, the timing signal $\phi_1$, and the like, and outputs the pieces of output data commonly to the neural network integrated circuit C2 in a next stage. Next, the neural network integrated circuit C2 generates output data $O_{21}$, output data $O_{22}$, . . . , and output data $O_{2n}$, respectively, on the basis of the output data $O_{12}$ to the output data $O_{1n}$, the timing signal $\phi_1$, and the like, and outputs the pieces of output data commonly to the neural network integrated circuit C3 in a next stage. Finally, the neural network integrated circuit C3 generates output data $O_{31}$, output data $O_{32}$, . . . , and output data $O_{3n}$, respectively, on the basis of the output data $O_{21}$ to the output data $O_{2n}$, the timing signal $\phi_1$, and the like, and outputs the pieces of output data.

In the neural network integrated circuit CC1 having the above-described configuration, outputting of the one-bit output data O from the n pieces of neurons NR to the n pieces of neurons NR in a next stage is repeated step by step, and thus finally, the neural network SS1 in FIG. 5(a), from which a total of n pieces of output data O are output, is modeled.

(E) With Regard to Third Example of Neural Network Integrated Circuit According to First Embodiment Next, a third example of the neural network integrated circuit according to the first embodiment will be described with reference to FIG. 6. Furthermore, in FIG. 6, the same reference numeral will be given to the same constituent member as in the neural network circuit described with reference to FIG. 2 and FIG. 3 according to the first embodiment, and detailed description thereof will be omitted.

The third example of the neural network integrated circuit according to the first embodiment is an example of a neural network integrated circuit for modeling a neural network SS2 illustrated in FIG. 6(a). The neural network SS2 is a neural network that is composed of a plurality of sets, each including m pieces of neurons NR indicated by hatching in FIG. 6(a). One-bit output data O is output from each of n pieces of neurons NR (indicated by a broken line in FIG. 6(a)) which are common to the neurons NR, and therefore a total of m×the number of the above-described sets of one-bit output data O are respectively output from the neurons NR indicated by hatching in FIG. 6(a). In a case of the neural network SS2, each of the neurons NR indicated by hatching in FIG. 6(a) respectively receives the same number (n pieces) of one-bit output data O. That is, the neural network SS2 is a one-stage neural network of a parallel multi-input and parallel multi-output type.

Even in a case of modeling the neural network SS2, as in the neural network S1 described with reference to FIG. 4, in the neural network circuit CS described with reference to FIG. 2 and FIG. 3 according to the first embodiment, it is also assumed that the number of pieces of the one-bit input data I is set to "n". At this time, each of neural network circuits CS, to which these n pieces of input data I are input, has a configuration of modeling the function of the neuron NR indicated by hatching in FIG. 6(a), and executes the above-described multiplication processing, the addition processing, and the activation processing. In addition, as the third example of the neural network integrated circuit according to the first embodiment, the neural network circuit CS11 and the like, to which the n pieces of input data I are input, are connected in parallel to be integrated in a number corresponding to the above-described sets.

That is, as illustrated in FIG. 6(b), in the neural network integrated circuit CC2 that is the third example of the neural network integrated circuit according to the first embodiment, m pieces of the neural network circuits CS11 to CS1m, to which n pieces of one-bit input data $I_1$ to $I_n$ are commonly input, are integrated to constitute one neural network integrated circuit C1 (refer to FIG. 4(b)). In addition, m pieces of neural network circuits CS21 to CS2m, to which the same n pieces of input data $I_1$ to $I_n$ are commonly and respectively input in parallel, are integrated to constitute another neural network integrated circuit C2 (refer to FIG. 4(b)). Then, similarly, m pieces of neural network circuits, to which n pieces of input data $I_1$ to $I_n$ are commonly and respectively input in parallel, are integrated to constitute still another neural network integrated circuit respectively (not illustrated in FIG. 6(b)). Here, as in the case described with reference to FIG. 5, the same timing signal $\phi_1$ and the like as in FIG. 4(a) are commonly input to each of the neural network circuits CS 11 and the like, but description thereof is omitted in FIG. 6(b) for simplification of explanation. In addition, the neural network integrated circuit C1 respectively generates and outputs one-bit output data $O_{11}$, one-bit output data $O_{12}$, . . . , and one-bit output data $O_{1m}$ on the basis of the input data $I_1$ to the input data $I_n$, the timing signal $\phi_1$, and the like. On the other hand, the neural network integrated circuit C2 respectively generates and outputs one-bit output data $O_{21}$, one-bit output data $O_{22}$, . . . , and one-bit output data $O_{2m}$ on the basis of the same input data $I_1$ to input data $I_n$, the timing signal $\phi_1$, and the like. Subsequently, not illustrated other neural network integrated circuits also output m pieces of output data.

In the neural network integrated circuit CC2 having the above-described configuration, the pieces of output data O are output in parallel from the neurons NR provided in a number corresponding to m×sets, and thus finally, the neural network SS2 in FIG. 6(a) from which pieces of the output data O are output in a number corresponding to a total of m×sets is modeled.

(F) With Regard to Fourth Example of Neural Network Integrated Circuit According to First Embodiment Finally, a fourth example of the neural network integrated circuit according to the first embodiment will be described with reference to FIG. 7. Furthermore, in FIG. 7, the same reference numeral will be given to the same constituent member as in the neural network circuit described with reference to FIG. 2 and FIG. 3 according to the first embodiment, and detailed description thereof will be omitted.

The fourth example of the neural network integrated circuit according to the first embodiment is an example of the neural network integrated circuit for modeling a neural network SS3 illustrated in FIG. 7(a). The neural network SS3 is a neural network in which the degree of freedom of the number of the neurons NR and the connection aspect between the neurons NR is further improved in comparison to the above-described neural network S1 and the like according to the first embodiment. Furthermore, FIG. 7(a) illustrates the neural network SS3 in which the number of the neurons NR pertaining to a neuron group (refer to a broken line in FIG. 7(a)), in which one-bit output data O (input data I) is input and output, is gradually different in each case.

In a case of modeling the neural network SS3, in the neural network circuit CS described with reference to FIG. 2 and FIG. 3 according to the first embodiment, for example, it is assumed that the number of pieces of the one-bit input data I is set to "n". At this time, each of neural network circuits CS, to which the n pieces of input data I are input, has a configuration of modeling the function of the neuron NR illustrated in FIG. 7(a), and executes the above-described multiplication processing, the addition processing, and the activation processing. In addition, as a fourth example of the neural network integrated circuit according to the first embodiment, a plurality of neural network integrated circuits are provided, each of the neural network integrated circuits comprises a plurality of the neural network circuits CS11 to which the n pieces of input data I are input, and the like, and the neural network integrated circuits are integrated by being connected by a plurality of switches and a switch box for switching of the switches to be described later.

That is, as illustrated in FIG. 7(b), in a neural network integrated circuit CC3 that is the fourth example of the neural network integrated circuit according to the first embodiment, n pieces of neural network circuits CS11 to CS1n, to which n pieces of one-bit input data $I_1$ to $I_n$ are commonly and respectively input, are integrated to constitute one neural network integrated circuit C1 (refer to FIG. 4(b)). In addition, similarly, for example, m pieces of neural network circuits CS21 to CS2m are integrated to constitute one neural network integrated circuit C2, a neural network circuit CS31 to a neural network circuit CS3p (p is an integer of two or greater. The same shall apply hereinafter.) are integrated to constitute one neural network integrated circuit C3, and a neural network circuit CS41 to a neural network circuit CS4q (q is an integer of two or greater. The same shall apply hereinafter.) are integrated to constitute one neural network integrated circuit C4. In addition, each of the neural network integrated circuit C1 to the neural network integrated circuit C4 can mutually input and output one-bit input data I and output data O respectively through a switch SW1 to a switch SW4 as illustrated in FIG. 7(b). In addition, an aspect of input and output of the input data I and the output data O between the neural network integrated circuit C1 to the neural network integrated circuit C4 (that is, a connection aspect between the neural network integrated circuit C1 to the neural network integrated circuit C4) is switched by a switch box SB1 to a switch box SB4 through a switch SW1 to a switch SW4. At this time, the switch SW1 to the switch SW4, and the switch box SB1 to the switch box SB4 correspond to an example of a "switch unit" according to the invention.

Next, a detailed configuration of the switch box SB1 to the switch box SB4 will be described with reference to FIG. 7(c). Furthermore, the switch box SB1 to the switch box SB4 have the same configuration, and thus these will be collectively described as a switch box SB in FIG. 7(c).

As illustrated in FIG. 7(c), the switch box SB that controls a connection aspect of each of the one-bit input data I or output data O in the neural network integrated circuit CC3, and a resultant effective number of neurons NR is constituted through connection of a selector $M_1$ to a selector $M_5$ in an aspect illustrated in FIG. 7(c). In the configuration of the switch box SB illustrated in FIG. 7(c), a signal corresponding to the above-described input data I is a signal that is input from the left in FIG. 7(c), and a signal corresponding to the above-described output data O is a signal that is input from an upward side and a downward side in FIG. 7(c). In addition, switching of the input data I and the like with respect to the neural network integrated circuit C1 to the neural network integrated circuit C4 is executed by the selector $M_1$ to the selector $M_5$ to which a switching control signal $S_{c1}$ to a switching control signal $S_{c5}$ which control the switching are input from the outside.

As described above, the neural network SS3 that generates and outputs the output data O corresponding to the input data I as illustrated in FIG. 7(a) is modeled by the neural network integrated circuit CC3 having the configuration illustrated in FIG. 7(b) in which the switch SW1 to the switch SW4 are switched by the switch box SB1 to the switch box SB4 which have the configuration illustrated in FIG. 7(c).

As described above, according to the configuration and the operation of the neural network circuit CS, the neural network integrated circuit C1, and the like according to the first embodiment, as illustrated in FIG. 2 and FIG. 3, each of the memory cells 1, of which the number is predetermined on the basis of a brain function to be corresponded, stores any one of a predetermined value indicating "NC", "1", or "0" as a storage value, outputs "1" in correspondence with an input of the input data I in a case where a value of the one-bit input data I and the storage value are the same as each other, outputs "0" in correspondence with the input of the input data I in a case where the value of the input data I and the storage value are not the same as each other, and outputs the predetermined value even when the input data I with any value is input in a case where the predetermined value is stored. In addition, the majority determination circuit 2 outputs "1" or "0" as the output data O on the basis of a difference between a total number of the memory cells 1 which output the value of "1" and a total number of the memory cells 1 which output the value of "0". As a more specific example, in a case where the total number of the memory cells 1 which output the value of "1" is greater than the total number of the memory cells 1 which output the value of "0", the majority determination circuit 2 outputs the value of "1" as the output data O, and in a case where the total number of the memory cells 1 which output the value of "1" is equal to or less than the total number of the memory cells 1 which output the value of "0", the majority determination circuit 2 outputs "0" as the output data O. Accordingly, in the memory cells 1, the multiplication processing as the neural network circuit is performed, and the addition processing and the activation processing as the neural network circuit are performed by one piece of the majority determination circuit 2, and thus it is possible to efficiently realize the neural network circuit while greatly reducing the circuit scale and the cost corresponding thereto.

In addition, as illustrated in FIG. 4(b), in a case where m pieces of the neural network circuits CS, in which the number of the memory cells 1 is n respectively in correspondence with n pieces of the each one-bit input data I, are provided, the n pieces of input data I are commonly input in parallel with respect to each of the neural network circuits CS, and the output data O is respectively output from the neural network circuits CS, it is possible to efficiently realize n×m pieces of the neural network integrated circuits C1 which are obtained by modeling the neural network S1 illustrated in FIG. 4(a) and in which the number of inputs is n and the number of outputs is m while greatly reducing the circuit scale and the cost corresponding thereto. Furthermore, in this case, even in a case where various connection patterns exist between the m pieces of neurons NR indicated by hatching in FIG. 4(a), and the n pieces of neurons NR which output the output data O to the m pieces of neurons NR, it is possible to more efficiently realize the neural network integrated circuit C1 by using the above-described predetermined value as the storage value of the memory cells 1 which correspond to a case where connection between the neurons NR is not established in the neural network integrated circuit C1. Furthermore, in the case illustrated in FIG. 4, n pieces of input data I are commonly input in parallel with respect to the neural network circuits CS, and m pieces of output data O based on the n pieces of input data I can be output in parallel, and thus it is possible to greatly increase the speed of the processing in comparison to a case where pieces of the input data I and pieces of the output data O are sequentially input and output.

Furthermore, as illustrated in FIG. 5, in a case where the neural network integrated circuit C1 and the like in which above-described "n" and "m" are equal to each other are connected in series, and the output data O from one piece of the neural network integrated circuit C1 (or the neural network integrated circuit C2) is set as the input data I in another neural network integrated circuit C2 (or the neural network integrated circuit C3) that is connected to be immediately subsequent to the neural network integrated circuit C1 (or the neural network integrated circuit C2), it is possible to efficiently realize the neural network integrated circuit CC1 in which both of an input and an output are parallel type while greatly reducing the circuit scale and the cost corresponding thereto.

In addition, as illustrated in FIG. 6, in a case where n pieces of the input data I are commonly input in parallel with respect to the neural network integrated circuits CS, and m pieces of the output data O are output in parallel from the neural network integrated circuits CS, it is possible to efficiently realize the neural network integrated circuit CC2 in which an input and an output are parallel type and the number of pieces of the output data O is greater than the number of pieces of the input data I while greatly reducing the circuit scale and the cost corresponding thereto.

In addition, as illustrated in FIG. 7, in a case where the neural network integrated circuit C1 and the like are comprised in plural, and the input data I and the output data O with respect to the neural network integrated circuit C1 and the like are switched by the switch SW1 and the like which connect the neural network integrated circuit C1 and the like to each other in an array shape, when the switching operation in the switch SW1 and the like is predetermined on the basis of the brain function to be corresponded, it is possible to efficiently realize a neural network integrated circuit CC3 having a large scale while greatly reducing the cost corresponding thereto.

(II) Second Embodiment

Figure 9:
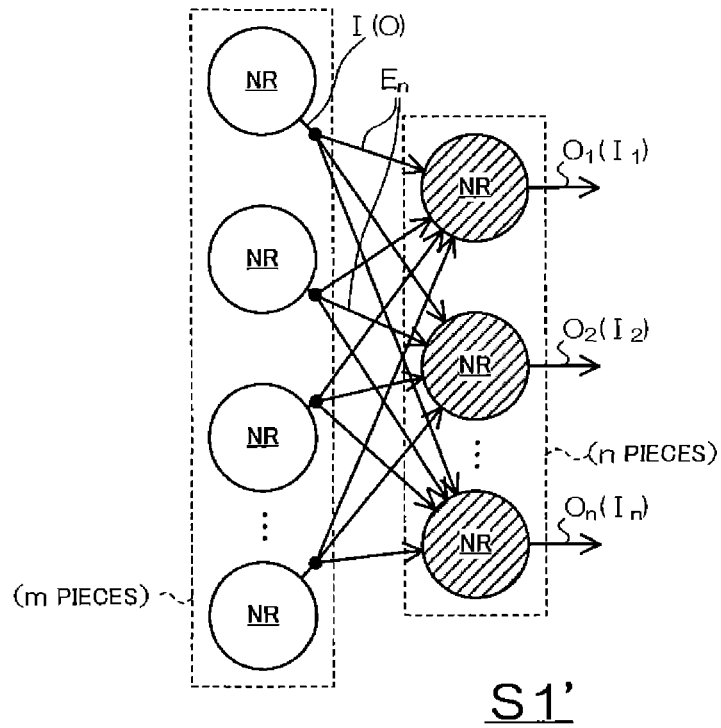
FIG. 9 is a diagram illustrating a first example of the neural network integrated circuit according to the second embodiment, (a) is a diagram illustrating a neural network corresponding to the first example, and (b) is a block diagram illustrating a configuration of the first example.
Figure 9:
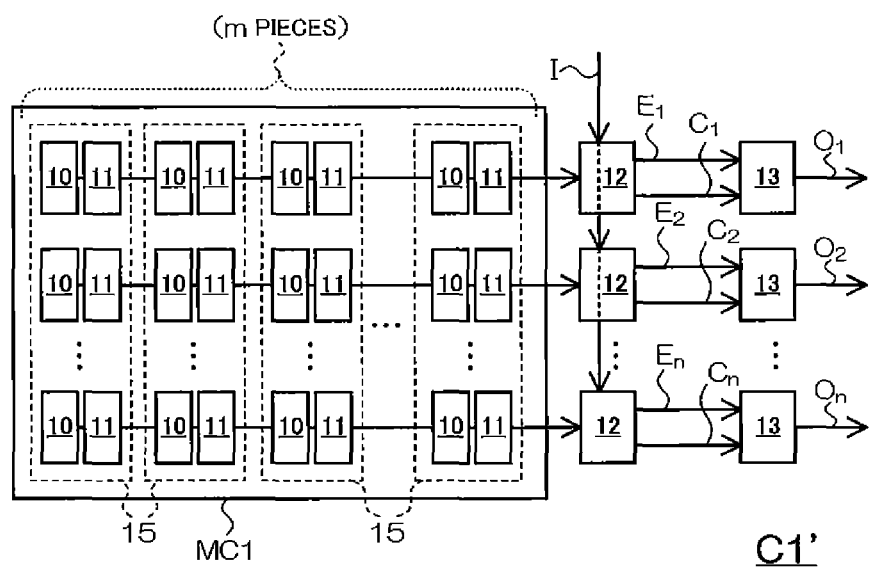
Figure 10:
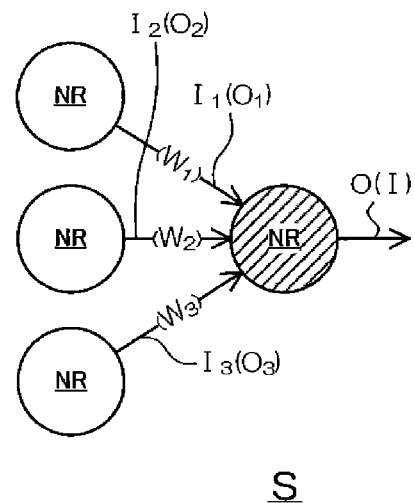
FIG. 10 is a diagram illustrating a first example of a neural network circuit according to the second embodiment, (a) is a diagram illustrating a neural network corresponding to the first example, and (b) is a block diagram illustrating a configuration of the first example.
Figure 10:
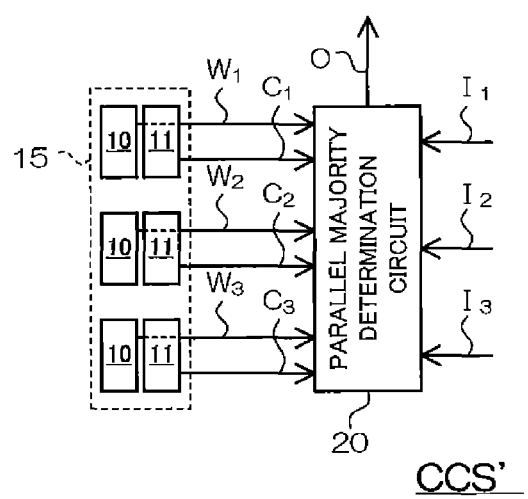
Figure 11:
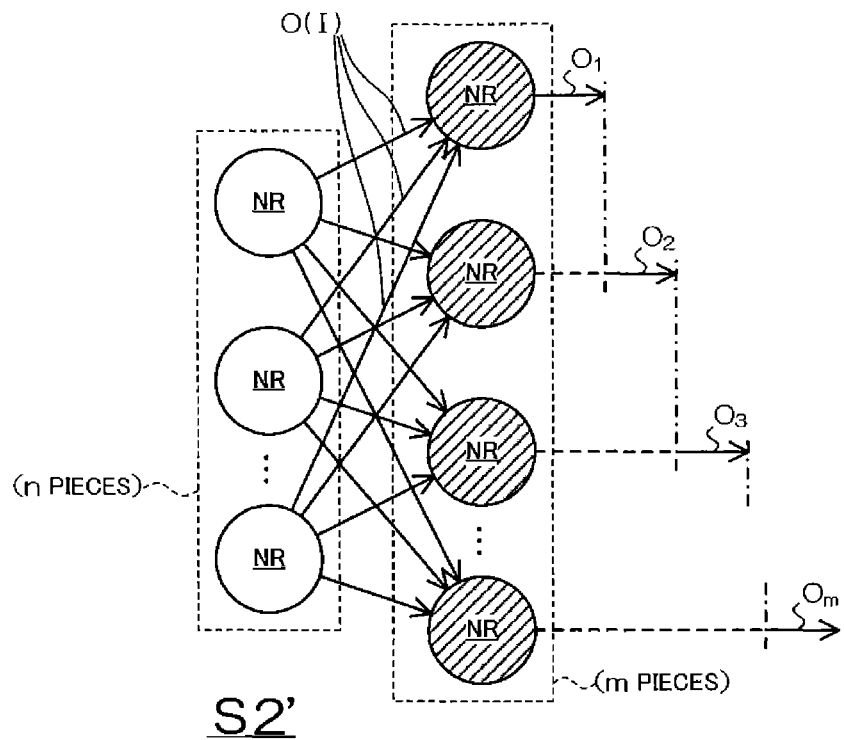
FIG. 11 is a diagram illustrating a second example of the neural network integrated circuit according to the second embodiment, (a) is a diagram illustrating a neural network corresponding to the second example, and (b) is a block diagram illustrating a configuration of the second example.
Figure 11:
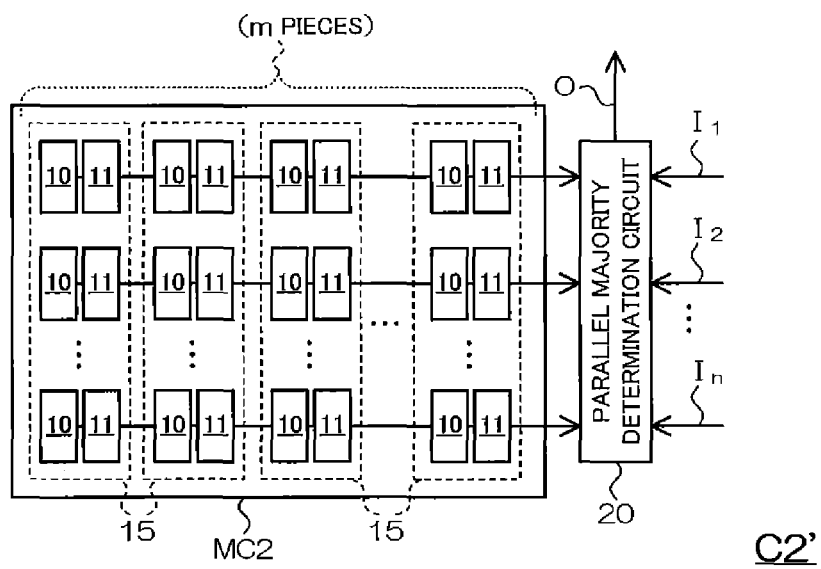
Figure 12:
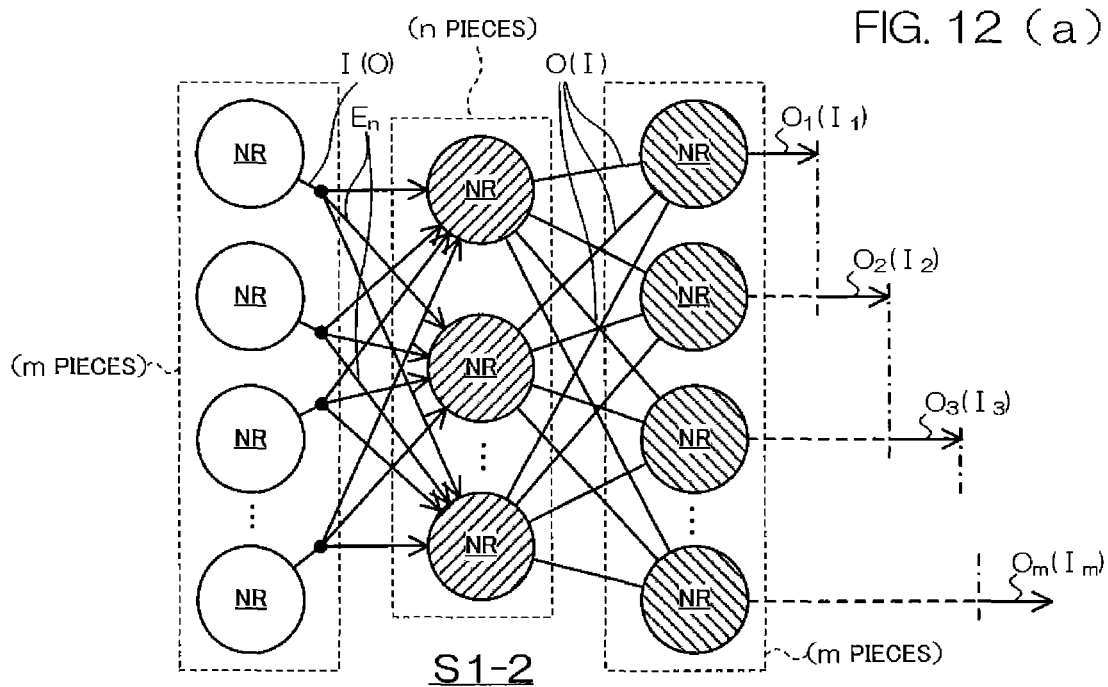
FIG. 12 is a diagram illustrating a third example of the neural network integrated circuit according to the second embodiment, (a) is a diagram illustrating a neural network corresponding to the third example, and (b) is a block diagram illustrating a configuration of the third example.
Figure 12:
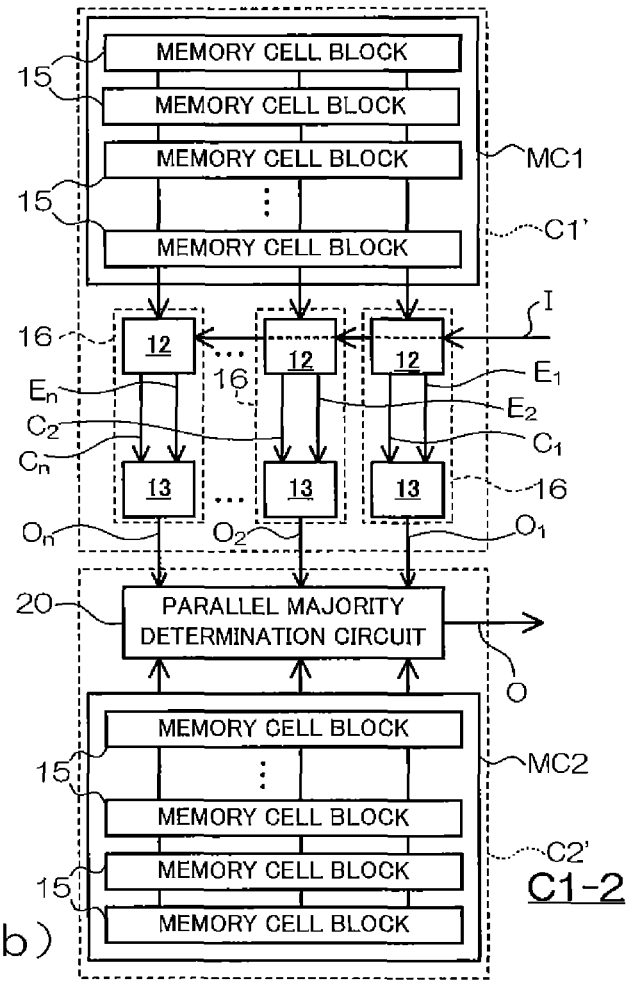
Figure 13:
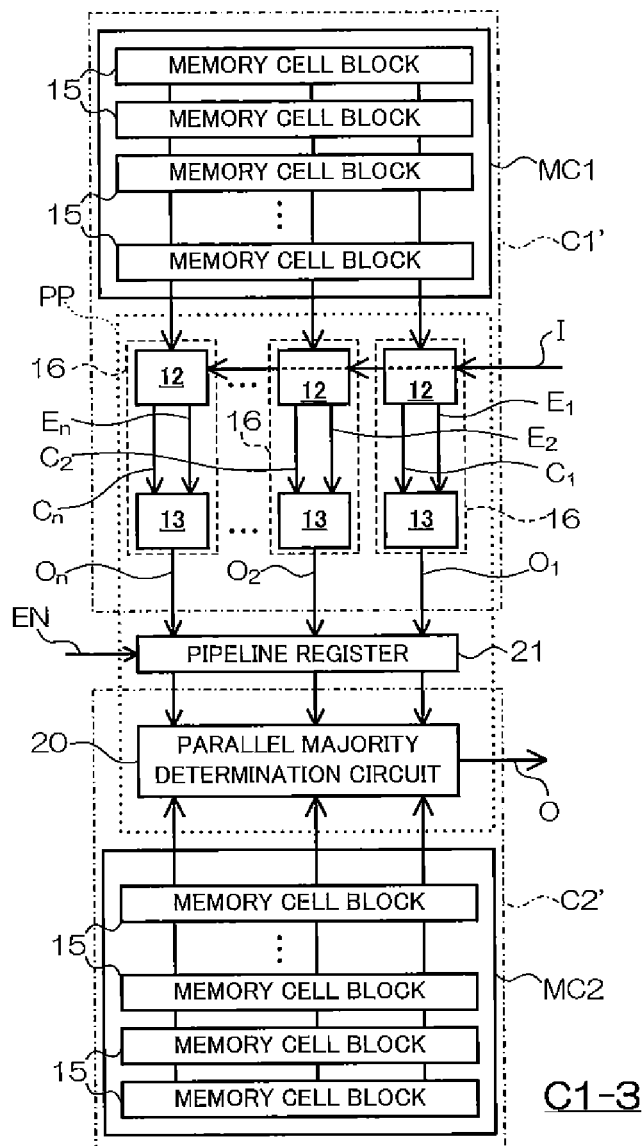
FIG. 13 is a diagram illustrating a fourth example of the neural network integrated circuit according to the second embodiment, (a) is a block diagram illustrating a configuration of the fourth example, and (b) is a diagram illustrating a circuit example corresponding to the fourth example.
Figure 13:
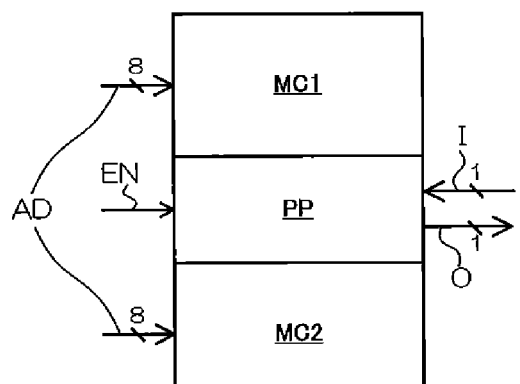
Figure 15:
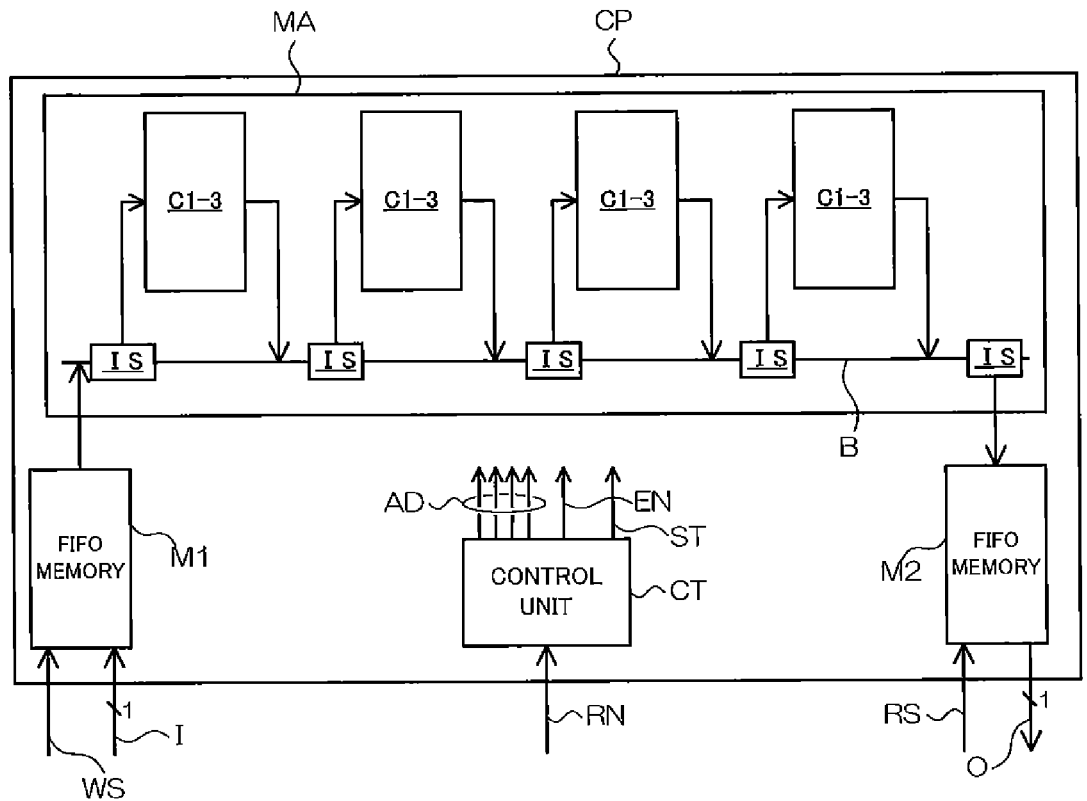
FIG. 15 is a diagram illustrating a fifth example of the neural network integrated circuit according to the second embodiment, (a) is a block diagram illustrating a configuration of the fifth example, and (b) is a block diagram illustrating a detailed configuration of a control unit according to the fifth example.
Figure 15:
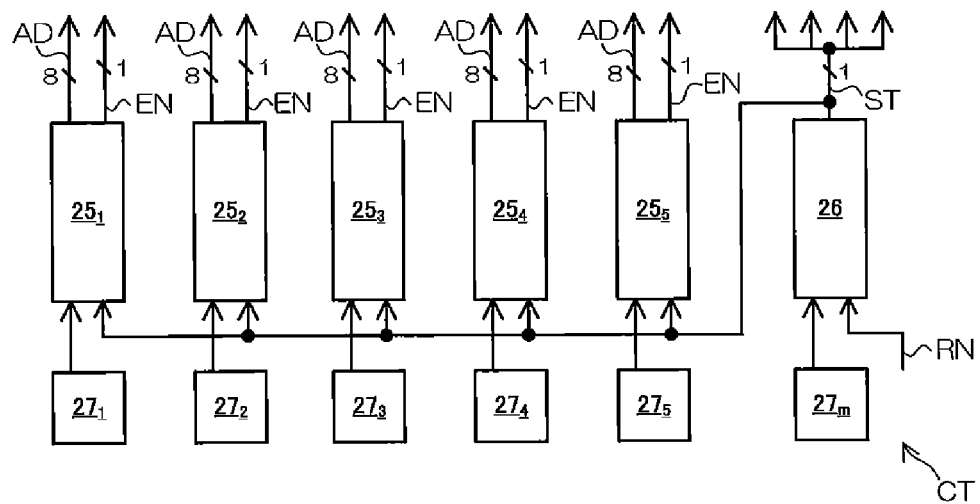
Figure 16:
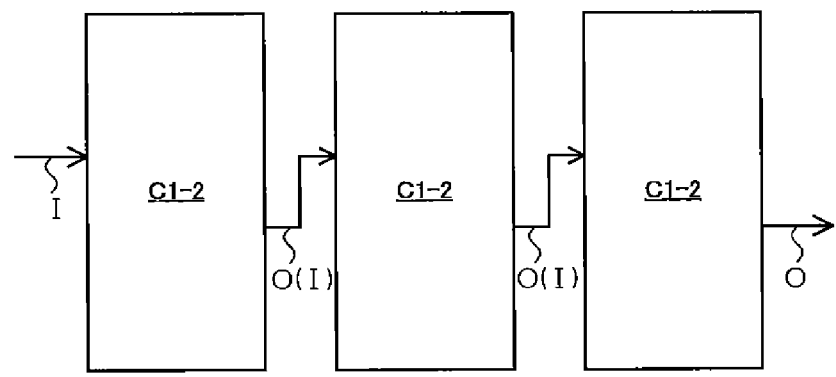
FIG. 16 is a block diagram illustrating a configuration of a sixth example and the like of the neural network integrated circuit according to the second embodiment, (a) is a block diagram illustrating a configuration of the sixth example, and (b) is a block diagram illustrating a configuration of a seventh example of the neural network integrated circuit according to the second embodiment.
Figure 16:
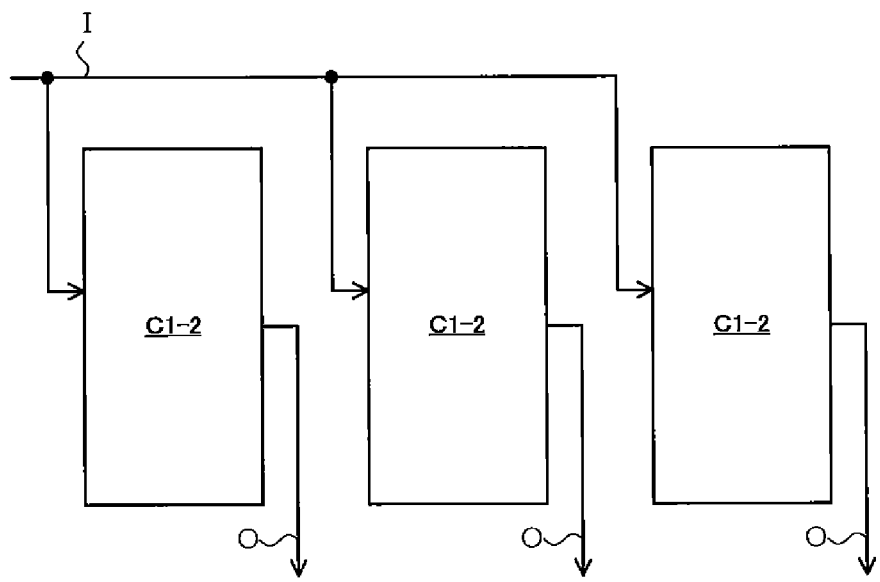

Next, a second embodiment according to this invention will be described with reference to FIG. 8 to FIG. 16. Furthermore, FIG. 8 and FIG. 9 are diagrams illustrating a first example of a neural network integrated circuit according to the second embodiment, FIG. 10 is a diagram illustrating a first example of a neural network circuit according to the second embodiment, and FIG. 11 is a diagram illustrating a second example of the neural network integrated circuit according to the second embodiment. In addition, FIG. 12 is a diagram illustrating a third example of the neural network integrated circuit, FIG. 13 is a diagram illustrating a fourth example of the neural network integrated circuit, FIG. 14 is a diagram illustrating a detailed configuration of the fourth example, FIG. 15 is a diagram illustrating a fifth example of the neural network integrated circuit according to the second embodiment, and FIG. 16 is a block diagram illustrating a configuration of a sixth example and the like of the neural network integrated circuit.

The following second embodiment is intended to model the neural network S and the like by a configuration and a method which are different from the configuration and the method of modeling of the neural network S and the like described with reference to FIG. 1 to FIG. 7.

(A) With Regard to First Example of Neural Network Integrated Circuit According to Second Embodiment First, a first example of the neural network integrated circuit according to the second embodiment will be described with reference to FIG. 8 and FIG. 9. Furthermore, FIG. 8 is a diagram illustrating a part of the first example of executing the above-described multiplication processing as the first example, and FIG. 9 is a diagram illustrating the entirety of the first example. At this time, the multiplication processing corresponds to an example of a "multiplication function" according to the invention.

As illustrated in FIG. 8(a), in a network S' that is modeled by a part of the first example, one-bit output data O (in other words, input data I) is input from one neuron NR. In addition, one of a weighting coefficient $W_1$ to a weighting coefficient $W_4$ different from each other, which respectively correspond to a plurality of different neurons (not illustrated) which become output destinations of the input data I, is multiplied to the input data I, and the resultant data is output with respect to the different neurons (not illustrated) as output data $E_1$ to output data $E_4$. In addition, the output data E at this time is a one-bit signal similar to the input data I. Accordingly, a value of the input data I, a value of the weighting coefficient W, and a value of the output data E which are illustrated in FIG. 8 are either "0" or "1".

Next, a configuration of the portion corresponding to the network S' illustrated in FIG. 8(a) in the first example of the neural network integrated circuit according to the second embodiment is illustrated as a network circuit CS' in FIG. 8(b). This network circuit CS' is composed of four sets of memory cells 10 and memory cells 11, each set corresponding to each of the output data $E_1$ to the output data $E_4$ illustrated in FIG. 8(a), and four majority determination input circuits 12 which respectively correspond to pieces of the output data E (in other words, pieces of input data I of above-described and not illustrated other neurons). At this time, the number of memory cell pairs comprising one memory cell 10 and one memory cell 11, and the number of the majority determination input circuits 12 corresponding to the memory cell pairs (four in the case illustrated in FIG. 8) are equal to the number of pieces of the output data O which is desired as the first example of the neural network integrated circuit according to the second embodiment. Furthermore, in the following description in FIG. 8, the memory cell pairs corresponding to the number of pieces of the output data O are collectively referred to as "memory cell block 15" (refer to a broken line in FIG. 8(b)). In addition, the memory cell 10 corresponds to an example of a "first storage unit" according to this invention, the memory cell 11 corresponds to an example of a second storage unit according to this invention, and the majority determination input circuit 12 corresponds to an example of a "first circuit unit" according to this invention.

In the above-described configuration, the memory cells 10 in each of the memory cell block 15 respectively store the one-bit weighting coefficient W that is set in advance on the basis of a brain function to which the first example of the neural network integrated circuit including the network circuit CS' and according to the second embodiment corresponds. In contrast, the memory cells 11 in each of the memory cell block 15 stores one-bit connection presence/absence information that is set in advance on the basis of the above-described brain function. Here, the connection presence/absence information corresponds to the storage value "NC" of the memory cell 1 in the first embodiment, and is a storage value indicating any one between a state in which connection is established between two neurons NR in the neural network according to the second embodiment is established and a state in which the connection is not established. Furthermore, which storage value is to be stored in the memory cell 10 and the memory cell 11 may be set in advance, for example, on the basis of which brain function is to be modeled as the first example of the neural network integrated circuit including the network S' and according to the second embodiment, and the like.

In addition, each of the memory cells 10 respectively outputs the storage values thereof to the majority determination input circuits 12 as the weighting coefficient $W_1$, the weighting coefficient $W_2$, the weighting coefficient $W_3$, and the weighting coefficient $W_4$. At this time, each of the memory cells 10 simultaneously outputs the storage values thereof to the majority determination input circuits 12 as the weighting coefficient $W_1$ to the weighting coefficient $W_4$.

Furthermore, this simultaneous output configuration is also true of respective memory cells 10 in neural network circuits and neural network integrated circuits to be described with reference to FIG. 9 to FIG. 16. On the other hand, each of the memory cells 11 respectively outputs the storage values thereof to the majority determination input circuits 12 as connection presence/absence information $C_1$, connection presence/absence information $C_2$, connection presence/absence information $C_3$, and connection presence/absence information $C_4$. In addition, the memory cells 11 simultaneously output the storage values thereof to the majority determination input circuits 12 as the connection presence/absence information $C_1$ to the connection presence/absence information $C_4$. In addition, each of the memory cells 11 simultaneously outputs the storage values thereof to the majority determination input circuits 12, for example, by shifting one cycle before or after output of storage values from the memory cells 10. Furthermore, this simultaneous output configuration and a relationship between output timings of the storage values from the memory cells 10 are also true of respective memory cells 11 in the neural network circuits and the neural network integrated circuits to be described with reference to FIG. 9 to FIG. 14. Furthermore, in the following description, when describing a common configuration, the connection presence/absence information $C_1$, the connection presence/absence information $C_2$, the connection presence/absence information $C_3$, and the connection presence/absence information $C_4$ are simply referred to as "connection presence/absence information C".

On the other hand, pieces of one-bit input data I are commonly input to the majority determination input circuits 12 from other nodes NR (refer to FIG. 8(a)) which are not illustrated in FIG. 8(b). In addition, each of the majority determination input circuits 12 respectively output pieces of the connection presence/absence information output from the corresponding memory cells 11 as is as the connection presence/absence information $C_1$ to the connection presence/absence information $C_4$ respectively.

In addition, each of the majority determination input circuits 12 calculates exclusive NOR (XNOR) between the weighting coefficient $W_1$, the weighting coefficient $W_2$, the weighting coefficient $W_3$, and the weighting coefficient $W_4$ which are output from the corresponding memory cells 10, and the above-described input data I, and respectively output the result as the output data $E_1$, the output data $E_2$, the output data $E_3$, and the output data $E_4$. At this time, a relationship between the storage values (weighting coefficients W) of the corresponding memory cells 11, values of the input data I, and values of the output data E output from the majority determination input circuits 12 becomes a relationship indicating a truth table in FIG. 8(c). Furthermore, exclusive OR (XOR) as an assumption for calculating the exclusive NOR (XNOR) is also described in FIG. 8(c).

Here, the truth table (refer to FIG. 2(c)) corresponding to the neural network circuit CS described with reference to FIG. 2 according to the first embodiment, and the above-described truth table illustrated in FIG. 8(c) will be compared with each other. At this time, in a case where assuming that the storage values in the memory cells 10 and the values of the input data I are respectively the same as in the truth table illustrated in FIG. 2(c), the values of the output data E illustrated in FIG. 8(b) become the same as the values of the output data E illustrated in FIG. 2(b). According to these, the network circuit CS' illustrated in FIG. 8(b) becomes a circuit obtained by modeling the above-described multiplication processing in the network S' illustrated in FIG. 8(a) by the same logic as in the above-described multiplication processing in the neural network circuit CS illustrated in FIG. 2(b). That is, calculation of the exclusive OR between the respective storage values (weighting coefficients W) output from each of the memory cells 10 and the values of the input data I in the majority determination input circuits 12 corresponds to the above-described multiplication processing. As described above, the multiplication processing in the network S' illustrated in FIG. 8(a) is modeled by the network circuit CS' illustrated in FIG. 8(b).

Next, the entirety of the first example of the neural network integrated circuit according to the second embodiment will be described with reference to FIG. 9. Furthermore, in FIG. 9, the same reference numeral will be given to the same constituent member as in the network circuit described with reference to FIG. 8 according to the second embodiment, and detailed description thereof will be omitted.

The first example of the neural network integrated circuit of which the entirety is described with reference to FIG. 9 according to the second embodiment is an integrated circuit in which a plurality of the network circuits CS' described with reference to FIG. 8 according to the second embodiment are integrated. In the first example of the neural network integrated circuit according to the second embodiment, the above-described addition processing and the above-described activation processing are executed in addition to the above-described multiplication processing corresponding to the network circuit CS'. At this time, the addition processing and the activation processing correspond to a first example of an "addition/application function" according to this invention.

First, the entirety of the neural network that is modeled by the first example of the neural network integrated circuit according to the second embodiment will be described with reference to FIG. 9(a). The neural network S1' illustrated in FIG. 9(a) includes the networks S' described with reference to FIG. 8 in a number corresponding to m pieces of neurons NR. In the neural network S1', one-bit output data O (in other words, input data I) is respectively output to each of n pieces of neurons NR illustrated by hatching in FIG. 9(a) from each of m pieces of neurons NR, each constituting the network S'. In addition, according to this, the output data O becomes the output data E, and is input to each of the n pieces of neurons NR indicated by hatching, and a total of n pieces of output data O are output in parallel one by one from the neurons NR indicated by hatching. That is, the above-described neural network S1' is an one-stage neural network of a serial (m)-input and parallel (n)-output type.

The first example of the neural network integrated circuit obtained by modeling the neural network S1' according to the second embodiment becomes a neural network integrated circuit C1' illustrated in FIG. 9(b). This neural network integrated circuit C1' comprises m pieces of the neural network circuits CS' (refer to FIG. 8) according to the second embodiment, each includes n pieces of the above-described memory cell pairs and n pieces of the above-described majority determination input circuits 12, and n pieces of serial majority determination circuits 13 in correspondence with each of the majority determination input circuits 12 and the memory cell pairs. At this time, the serial majority determination circuits 13 correspond to an example of the "second circuit unit" according to the invention. In addition, as illustrated in FIG. 9(b), a memory cell array MC1 is constituted by n×m pieces of the memory cell pairs (in other words, m pieces of the memory cell blocks 15). In addition, in the neural network integrated circuit C1', one of the majority determination input circuits 12 is shared by the memory cell pairs of one row (m pieces) in the memory cell array MC1 illustrated in FIG. 9(b). Furthermore, the timing signal $\phi_1$ and the like are commonly input to the memory cell array MC1, each of the majority determination input circuits 12, and each of the serial majority determination circuit 13, but description thereof is omitted in FIG. 9(b) for simplification of explanation.

In the above-described configuration, the weighting coefficient W is output from the memory cells 10 of the memory cell block 15, which constitutes each of the neural network circuits CS', simultaneously with respect to the memory cells 10 included in one of the memory cell block 15 and sequentially with respect to the m pieces of memory cell blocks 15 (that is, in a serial format). In addition, the above-described exclusive OR between the weighting coefficient W and m pieces of input data I (each of one-bit input data I) which are input in the serial format at a corresponding timing is operated in the shared majority determination input circuit 12 in a time-division manner, and the operation result is output as the output data E to the corresponding serial majority determination circuit 13 in a serial format. On the other hand, the above-described connection presence/absence information C is output from the memory cells 11 of the memory cell block 15, which constitutes each of the neural network circuits CS', simultaneously with respect to the memory cells 11 included in one of the memory cell blocks 15 and sequentially (that is, in a serial format) with respect to the m pieces of memory cell blocks 15. In addition, these connection presence/absence information C are output to the corresponding serial majority determination circuit 13 in a serial format corresponding to an input timing of each of the input data I through the above-described and shared majority determination input circuit 12. Furthermore, an output timing aspect of the above-described weighting coefficient W from each of the memory cell blocks 15, and an output timing aspect of the above-described connection presence/absence information C from each of the memory cell blocks 15 are respectively also true of respective memory cells 11 in neural network integrated circuits to be described with reference to FIG. 10 to FIG. 14. In addition, in FIG. 9(b), the above-described weighting coefficient $W_n$ output from the memory cells 10 and the above-described connection presence/absence information $C_n$ output from the memory cell 11 corresponding to the weighting coefficient $W_n$ are collectively indicated by one solid line for clarification and simplification as a drawing. This is also true of FIG. 11 to FIG. 14 in the following description.

Next, each of the n pieces of serial majority determination circuits 13, to which the output data E and the connection presence/absence information C are respectively input from the majority determination input circuits 12, adds the number of pieces of the output data E with a value of "1" to up to m pieces of output data E in which pieces of the connection presence/absence information C input at the same timing indicate "connection presence" to calculate the sum value thereof, and add the number of pieces of output data E with a value of "0" to calculate the sum value thereof. These addition correspond to the above-described addition processing. In addition, each of the serial majority determination circuits 13 compares the above-described sum values of the number of the pieces of output data E with the value of "1" and the number of the pieces of output data E with the value of "0", and outputs the output data O with the value of "1" only in a case where a value obtained by subtracting the latter number from the former number is equal to or greater than a majority determination threshold value that is set in advance in the same manner as in the above-described majority determination threshold value according to the first embodiment. On the other hand, in the other case, that is, the value obtained by subtracting the sum value of the number of pieces of the output data E with the value of "0" from the sum value of the number of pieces of the output data E with the value of "1" is less than the above-described majority determination threshold value, each of the serial majority determination circuits 13 outputs the output data O with the value of "0". The processing in each of the serial majority determination circuits 13 corresponds to the above-described activation processing, and each of the output data O becomes one bit. Here, in a case where pieces of the connection presence/absence information C output at the same timing indicate "connection absence", the serial majority determination circuit 13 does not add the output data E to any of the number of pieces of the output data E with the value of "1" and the number of pieces of the output data E with the value of "0". In addition, each of the serial majority decision circuit 13 repeats outputting of the one-bit output data O by the above-described processing in accordance with the timing at which the input data I is input. As a result, pieces of the output data O at this time are output from the serial majority decision circuits 13 in parallel. In this case, a total number of pieces of the output data O becomes "n". As described above, the above-described multiplication processing, the addition processing, and the activation processing which correspond to one neuron NR indicated by hatching in FIG. 9(a) are executed by the memory cell pairs corresponding to one row in the memory cell arrays MC1 illustrated in FIG. 9(b), and the majority determination input circuit 12 and the serial majority determination circuit 13 which correspond to the memory cell pairs.

As described above, the neural network S1', in which the one-bit output data O is respectively output from each of the m pieces of neurons NR to the n pieces of neurons NR indicated by hatching in FIG. 9(a), and a total of n pieces of output data O are output from the n pieces of neurons NR, is modeled by the neural network integrated circuit C1' having the configuration illustrated in FIG. 9(b).

More specifically, according to the configuration of the neural network integrated circuit C1' which corresponds to the brain function of human beings and to and from which the one-bit input data I and the one-bit output data O are input and output, the above-described multiplication processing is executed by the memory cells 10, the memory cells 11, and the majority determination input circuits 12, and the addition processing and the activation processing are executed by the serial majority determination circuits 13, and thus it is possible to efficiently realize the neural network S1' corresponding to the brain function of the human beings while greatly reducing the circuit scale and the cost corresponding thereto.

In addition, according to the configuration of neural network integrated circuit C1', the number of pieces of input data I is set to 1 (one). Each of the number of pieces of the output data O, the number of the memory cells 10, the number of the memory cells 11, the number of the majority determination input circuits 12, and the number of the serial majority determination circuits 13 are set to the predetermined number of two or greater based on the brain function to be corresponded. Each of the weighting coefficient W and the connection presence/absence information C are set to values corresponding to the brain function respectively. In addition, each of the majority determination input circuits 12 generates the exclusive OR between the weighting coefficient W corresponding to the output data O and the input data I for every output data O, each of the serial majority determination circuits 13 outputs the value of "1" as the output data O when (the total number of pieces of the output data E with the value of "1"−the total number of pieces of the output data E with the value of "0")≥the majority determination threshold value), and outputs the value of "0" as the output data O when (the total number of pieces of the output data E with the value of "1"−the total number of pieces of the output data E with the value of "0"<the majority determination threshold value). Accordingly, the multiplication processing is executed by each of the memory cells 10, each of the memory cells 11, and each of the majority determination input circuits 12 for every output data O, and the addition processing and the activation processing are executed by each of the serial majority determination circuits 13 for every output data O, and thus it is possible to efficiently realize the neural network S1' of a so-called serial-input and parallel-output type while greatly reducing the circuit scale and the cost corresponding thereto.

(B) With Regard to First Example of Neural Network Circuit According to Second Embodiment Next, a first example of the neural network circuit according to the second embodiment will be described with reference to FIG. 10.

As illustrated in FIG. 10(a), basically, a neural network S corresponding to the first example has the same configuration as that of the neural network S illustrated in FIG. 2(a) according to the first embodiment. However, in the example illustrated in FIG. 10(a), with respect to one neuron NR indicated by hatching in FIG. 10(a), pieces of one-bit input data I (output data O in terms of different neurons NR) from three different neurons NR are input in parallel, and one piece of output data O corresponding to the pieces of input data is output from the neuron NR in a serial format. The piece of output data O at this time is also one-bit signals similar to the pieces of input data I. Accordingly, a value of the input data I and a value of the output data O illustrated in FIG. 10 are either "0" or "1". In addition, Expression (1) corresponding to the above-described multiplication processing and the like which are executed by the neuron NR illustrated in FIG. 10(a) is an expression when n is set to 3 in the above-described Expression (1). That is, the neural network S is a one-stage neural network of a parallel-input and serial-output type.

Next, a configuration of the first example of the neural network circuit corresponding to the neuron NR indicated by hatching in FIG. 10(a) according to the second embodiment is illustrated as a neural network circuit CCS' in FIG. 10(b). The neural network circuit CCS' corresponding to the neuron NR according to the second embodiment is composed of three sets of memory cells 10 and memory cells 11, each set corresponding to each piece of input data I illustrated in FIG. 10(a), and a parallel majority determination circuit 20 to which each of the input data I is input. At this time, the number of memory cell pairs comprising one memory cell 10 and one memory cell 11 (three in a case illustrated in FIG. 10) is the same as the number of pieces of input data I which is desired as the neural network S illustrated in FIG. 10(a). Furthermore, in the following description of FIG. 10, the memory cell pairs corresponding to the number of pieces of the input data I are indicated by a memory cell block 15 (refer to a broken line in FIG. 10(b)).

In the above-described configuration, the memory cell 10 in each of the memory cell block 15 respectively stores one-bit weighting coefficient W that is set in advance on the basis of a brain function to which the neural network circuit CCS' corresponds. In contrast, the memory cell 11 in each of the memory cell block 15 respectively stores one-bit connection presence/absence information that is set in advance on the basis of the brain function. Here, these connection presence/absence information are the same information as the connection presence/absence information $C_n$ in the first example of the neural network circuit described with reference to FIG. 8 and FIG. 9 according to the second embodiment, and thus detailed description thereof will be omitted. In addition, which storage value is to be stored in the memory cell 10 and the memory cell 11 may be set in advance, for example, on the basis of which brain function is to be modeled as the neural network S illustrated in FIG. 10(a).

In addition, each of the memory cells 10 outputs the storage values thereof to the parallel majority determination circuit 20 as a weighting coefficient $W_1$, a weighting coefficient $W_2$, and a weighting coefficient $W_3$ at the same timing as in the memory cells 10 illustrated in FIG. 8(b). On the other hand, the memory cells 11 also output pieces of connection presence/absence information C which are storage values thereof to the parallel majority determination circuit 20 at the same timing as in the memory cells 11 illustrated in FIG. 8(b).

On the other hand, as described above, input data $I_1$, input data $I_2$, and input data $I_3$ (one-bit in each case) are input to the parallel majority determination circuit 20 in parallel. In addition, the parallel majority determination circuit 20 performs an operation including the same operation as in one set of the majority determination input circuit 12 and the serial majority determination circuit 13 described with reference to FIG. 9 (that is, the above-described multiplication processing, the above-described addition processing, and the above-described activation processing). Specifically, first, in a case where corresponding connection presence/absence information C indicates "connection presence", the parallel majority determination circuit 20 operates the exclusive OR between each of the one-bit input data I and the weighting coefficient W corresponding thereto with respect to the input data I. Next, the parallel majority determination circuit 20 adds a number that is the operation result of a value of "1" to the operation result to calculate the sum value, and adds a number that is the operation result of a value of "0" to the operation result to calculate the sum value. In addition, the parallel majority determination circuit 20 compares the above-described sum values of the number that is the operation result of the value of "1" and the number that is the operation result of the value of "0", and outputs the output data O of the value of "1" in a serial format only in a case where a value obtained by subtracting the latter number from the former number is equal to or greater than a majority determination threshold value that is set in advance in the same manner as in the majority determination threshold value according to the first embodiment. On the other hand, in the other case, that is, the value obtained by subtracting the sum value of the number of pieces of the output data E with the value of "0" from the sum value of the number of pieces of the output data E with the value of "1" is less than the majority determination threshold value, the parallel majority determination circuit 20 outputs the output data O with the value of "0" in a serial format. In this case, the output data O becomes one bit. Here, in a case where the corresponding connection presence/absence information C indicates "connection absence", the parallel majority determination circuit 20 does not operate the above-described exclusive OR. Furthermore, in a case where the exclusive OR between the input data I and the corresponding weighting coefficient W is operated at once with respect to the entirety of pieces of the input data I, and the corresponding connection presence/absence information C indicates "connection absence", the operation result may not be added to any of the number that is the operation result of the value of "1" and the number that is the operation result of the value of "0". In addition, the parallel majority determination circuit 20 repeats outputting of the one-bit output data O in the serial format by each of the above-described processing for every number of pieces of the input data I which are input respectively in parallel. According to each of the above-described processing, the neural network circuit CCS' illustrated in FIG. 10(b) becomes a circuit obtained by modeling the above-described multiplication processing, the addition processing, and the activation processing in the neuron NR indicated by hatching in FIG. 10(a).

(C) With Regard to Second Example of Neural Network Integrated Circuit According to Second Embodiment Next, a second example of the neural network integrated circuit according to the second embodiment will be described with reference to FIG. 11. Furthermore, in FIG. 11, the same reference numeral will be given to the same constituent member as in the neural network circuit described with reference to FIG. 10 according to the second embodiment, and detailed description thereof will be omitted.

The second example of the neural network integrated circuit described with reference to FIG. 11 according to the second embodiment is an integrated circuit in which a plurality of the neural network circuits CCS' described with reference to FIG. 10 according to the second embodiment are integrated, and is configured to model a complicated neural network including a more lot of neurons NR.

First, a neural network that is modeled by the second example of the neural network integrated circuit according to the second embodiment will be described with reference to FIG. 11(a). A neural network S2' illustrated in FIG. 11(a) has a configuration in which one-bit output data O (input data I in terms of m pieces of neurons NR) is input to the m pieces of neurons NR indicated by hatching in FIG. 11(a) from each of n pieces of neurons NR in parallel, and output data O corresponding to the pieces of input data I is output from each of the neurons NR in a serial format. As is the case with the input data I, the output data O at this time is a one-bit signal. Accordingly, a value of the input data I and a value of the output data O illustrated in FIG. 11 are either "0" or "1". That is, the neural network S2' is a one-stage neural network of a parallel-input and serial-output type.

The second example of the neural network integrated circuit obtained by modeling the neural network S2' according to the second embodiment becomes a neural network integrated circuit C2' illustrated in FIG. 11(b). The neural network integrated circuit C2' comprises m pieces of the neural network circuits CCS' (refer to FIG. 10) according to the second embodiment, each including n pieces of the above-described memory cell pairs, and the parallel majority determination circuit 20. In addition, a memory cell array MC2 is constituted by n×m pieces of the above-described memory cell pairs (in other words, m pieces of memory cell blocks 15) as illustrated in FIG. 11(b). In addition, in the neural network integrated circuit C2', one parallel majority determination circuit 20 is shared by the memory cell pairs of one row (m pieces) in the memory cell array MC2 illustrated in FIG. 11(b). Furthermore, the above-described timing signal $\phi_1$ and the like are commonly input to the memory cell array MC2 and the parallel majority determination circuit 20, but description thereof is omitted in FIG. 11(b) for simplification of explanation.

In the above-described configuration, the above-described weighting coefficient W is output from the memory cells 10 of the memory cell block 15 that constitutes each of the neural network circuits CCS' to the parallel majority determination circuit 20 at the same timing as in each of the memory cells 10 and each of the memory cell blocks 15 as illustrated in FIG. 9(b). On the other hand, the connection presence/absence information C is output from the memory cells 11 of the memory cell block 15 that constitutes the each of the neural network circuits CCS' to the parallel majority determination circuit 20 at the same timing as in the memory cells 11 and the memory cell blocks 15 as illustrated in FIG. 9(b).

In addition, the parallel majority determination circuit 20 performs operation processing of the above-described exclusive OR by using the weighting coefficient W for which the connection presence/absence information C indicates "connection presence" and the input data I, addition processing of a number that is an operation result of the value of "1" and a number that is an operation result of the value of "0" on the basis of the operation result, comparison processing of the above-described sum number on the basis of the addition result (refer to FIG. 10(b)), and generation processing of the output data O on the basis of the comparison result with respect to one row (m pieces) in the memory cell array MC2 on the basis of the weighting coefficient W and the connection presence/absence information C which are output from the memory cell array MC2, and input data I corresponding thereto. In addition, the parallel majority determination circuit 20 executes the operation processing, the addition processing, the comparison processing, and the generation processing related to the above-described one row in a serial format with respect to each of the input data I for every memory block 15, and outputs the output data O as a result of the execution in a serial format. Here, in a case where the corresponding connection presence/absence information C indicates "connection absence", the parallel majority determination circuit 20 does not perform the above-described operation processing, the addition processing, the comparison processing, and the generation processing.

As described above, the neural network S2', in which the output data O is output to the m pieces of neurons NR indicated by hatching in FIG. 11(a) from each of the n pieces of neurons NR, and the one-bit output data O is output from the m pieces of neurons NR in a serial format, is modeled by the neural network integrated circuit C2' having the configuration illustrated in FIG. 11(b).

More specifically, according to the configuration of the neural network integrated circuit C2', the number of pieces of the output data O is set to 1 (one), the number of the parallel majority determination circuits 20 is set to 1 (one), the number of pieces of the input data I, the number of the memory cells 10, and the number of the memory cells 11 are set to a predetermined number of two or greater based on the brain function to be corresponded, and the weighting coefficient W and the connection presence/absence information C are set to values corresponding to the brain function. In addition, the parallel majority determination circuit 20 generates the exclusive OR between the weighting coefficient W corresponding to the input data I and the input data I for every input data I, further outputs the value of "1" as the output data O when (the total number of the exclusive OR with the value of "1"−the total number of the exclusive OR with the value of "0"≥the majority determination threshold value), and outputs the value of "0" as the output data O when (the total number of the exclusive OR with the value of "1"−the total number of the exclusive OR with the value of "0"<the majority determination threshold value). Accordingly, the multiplication processing is executed by each of the memory cells 10, each of the memory cells 11, and one piece of the parallel majority determination circuit 20 for every input data I, and the addition processing and the activation processing are executed for every input data I by the parallel majority determination circuit 20, and thus it is possible to efficiently realize the neural network S2' of a so-called parallel-input and serial-output type while greatly reducing the circuit scale and the cost corresponding thereto.

(D) With Regard to Third Example of Neural Network Integrated Circuit According to Second Embodiment Next, a third example of the neural network integrated circuit according to the second embodiment will be described with reference to FIG. 12. Furthermore, in FIG. 12, the same reference numeral will be given to the same constituent member as in the neural network circuit described with reference to FIG. 8 and FIG. 10 according to the second embodiment, and detailed description thereof will be omitted.

The third example of the neural network integrated circuit described with reference to FIG. 12 according to the second embodiment is an integrated circuit in which the neural network integrated circuit C1' described with reference to FIG. 9 according to the second embodiment, and the neural network integrated circuit C2' described with reference to FIG. 11 according to the second embodiment are combined with each other. Here, as described above, the neural network integrated circuit C1' is a neural network circuit obtained by modeling the one-stage neural network S1' of the serial-input and parallel-output type. On the other hand, as described above, the neural network integrated circuit C2' is a neural network circuit obtained by modeling the one-stage neural network S2' of the parallel-input and serial-output type. In addition, the third example of the neural network integrated circuit, in which the neural network circuits are combined, according to the second embodiment is a neural network integrated circuit that models a multi-stage neural network of a serial-input/parallel-processing/serial-output type, and is configured to model a complicated neural network including a more lot of neurons NR.

First, a neural network that is modeled by the third example of the neural network integrated circuit according to the second embodiment will be described with reference to FIG. 12(a). A neural network S1-2 illustrated in FIG. 12(a) is a neural network in which one-bit output data O is respectively output from each of m pieces of neurons NR to each of n pieces of neurons NR indicated by hatching of 45° in FIG. 12(a) in a serial format, input and output of the output data O and input data I is performed between these neurons NR indicated by hatching of 45° and m pieces of neurons NR indicated by hatching of 135° in FIG. 11(a), and as a result, each of the output data O is output from the m pieces of neurons NR indicated by hatching of 135° in a serial format. Furthermore, as a whole, the neural network S1-2 corresponds to a neural network in which a plurality of the neural networks S1 described with reference to FIG. 4 are arranged in a row.

The third example of the neural network integrated circuit obtained by modeling the above-described neural network S1-2 according to the second embodiment becomes a neural network integrated circuit C1-2 illustrated in FIG. 12(b). The neural network integrated circuit C1-2 has a configuration in which each piece of the output data O (each piece of output data O that is output in parallel) of the neural network integrated circuit C1' described with reference to FIG. 9 is set as input data (that is, input data I illustrated in FIG. 11(b)) to the parallel majority determination circuit 20 in the neural network integrated circuit C2' described with reference to FIG. 11, and the output data O is output from the parallel majority determination circuit 20 in a serial format. As described above, the neural network integrated circuit C1' and the neural network integrated circuit C2' are combined with each other, and as a result, the neural network S1-2, in which the neural network S1' illustrated in FIG. 9(a) and the neural network S2' illustrated in FIG. 11(a) are combined with each other, is modeled. Furthermore, operations of the neural network integrated circuit C1' and the neural network integrated circuit C2' which are included in the neural network S1-2 are similar to the operations described with reference to FIG. 9 and FIG. 11. Furthermore, in the neural network integrated circuit C1-2 illustrated in FIG. 12(b), a serial majority determination circuit 16 corresponding to the parallel majority determination circuit 20 is constituted by a set of majority determination input circuit 12 and serial majority determination circuit 13 which are indicated by a broken line.

As described above, the neural network S1-2 illustrated in FIG. 12(a) is modeled by the neural network integrated circuit C1-2 having a serial-input/parallel-processing/serial-output type configuration illustrated in FIG. 12(b).

More specifically, according to the configuration of the neural network integrated circuit C1-2, the neural network integrated circuit C1' and the neural network integrated circuit C2' are comprised, each piece of the output data O output from the neural network integrated circuit C1 to which one piece of the input data I is input is respectively set as each of the input data I in the neural network integrated circuit C2', and one piece of the output data O is output from the neural network integrated circuit C2'. Accordingly, since the neural network integrated circuit C1' and the neural network integrated circuit C2' are connected, and thus it is possible to efficiently realize the neural network S1-2 capable of corresponding to various brain functions while greatly reducing the circuit scale and the cost corresponding thereto.

(E) With Regard to Fourth Example of Neural Network Integrated Circuit According to Second Embodiment Next, a fourth example of the neural network integrated circuit according to the second embodiment will be described with reference to FIG. 13 and FIG. 14. Furthermore, in FIG. 13 and FIG. 14, the same reference numeral will be given to the same constituent member as in the neural network circuit described with reference to FIG. 9, FIG. 11, and FIG. 12 according to the second embodiment, and detailed description thereof will be omitted.

As illustrated in FIG. 13(a), the fourth example of the neural network integrated circuit described with reference to FIG. 13 according to the second embodiment is a neural network integrated circuit C1-3 having a configuration in which, with respect to the neural network integrated circuit C1-2 according to the second embodiment and described with reference to FIG. 12, a pipeline register 21 is interposed between the neural network integrated circuit C1' and the neural network integrated circuit C2' which constitute the neural network integrated circuit C1-2. This pipeline register 21 corresponds to an example of a "register unit" according to this invention. In addition, the pipeline register 21 temporarily stores data in a number corresponding to a bit width of the memory cell array MC1, and an output operation thereof is controlled by an enable signal EN from the outside. This enable signal EN is a timing signal corresponding to even-reference clock among reference clock signals set in advance. In addition, as illustrated in FIG. 13(b), as a whole, the neural network integrated circuit C1-3 has a configuration in which a parallel operator PP, to which, for example, m peace of one-bit input data I is input in a serial format, and the enable signal EN is input, and from which, for example, m peace of one-bit output data O corresponding to these input data I and these enable signal EN is output in a serial format, is interposed between the memory cell array MC1 in the neural network integrated circuit C1' and the memory cell array MC2 in the neural network integrated circuit C2'. At this time, the memory cell array MC1 and the memory cell array MC2 have a scale corresponding to, for example, 512 words in a 256-bit width, and for example, eight-bit address data AD for address designation is input to the memory cell arrays MC1 and MC2. In addition, the parallel operator PP in this case includes the majority determination input circuit 12 and the serial majority determination circuit 13 which correspond to 256 bits, the above-described pipeline register 21, and the parallel majority determination circuit 20 corresponding to 256 bits.

In the above-described configuration, each of the operations of the neural network integrated circuit C1' and the neural network integrated circuit C2' which are included in the neural network S1-3 are similar to the operations described with reference to FIG. 9 and FIG. 11. On the other hand, the pipeline register 21 temporarily stores, for example, the output data O read out from the memory cell array MC1 of the neural network integrated circuit C1' at a timing at which generation/outputting processing of the output data O in the parallel majority determination circuit 20 is performed on the basis of the weighting coefficient W and the connection presence/absence information C that are read out from the memory cell array MC2 of the neural network integrated circuit C2'. In addition, at a timing at which the processing of the parallel majority determination circuit 20 based on the weighting coefficient W and the connection presence/absence information C is completed, the pipeline register 21 outputs the output data O, which is read out from the memory cell array MC1 and is stored, to the parallel majority determination circuit 20 to perform generation/outputting processing of the output data O based on the output data O. According to the processing, read-out of the output data O from the memory cell array MC1 and read-out of the weighting coefficient W and the connection presence/absence information C from the memory cell array MC2 can be simultaneously performed in appearance, and as a result, it is possible to realize a processing speed that is approximately two times in comparison to the neural network S1-2 described with reference to FIG. 12.

Next, particularly, a detailed configuration of the parallel operator PP in the neural network integrated circuit C1-3 illustrated in FIG. 13 will be described with reference to FIG. 14.

First, as illustrated in FIG. 14(a), the parallel operator PP is composed of a serial majority determination circuit 16 including the above-described majority determination input circuit 12 and the above-described serial majority determination circuit 13 in a number corresponding to the bit width of the memory cell array MC1, the above-described pipeline register 21 corresponding to the bit width of the memory cell array MC1, and the above-described parallel majority determination circuit 20 that outputs output data O through an output flip-flop circuit 22. In this configuration, as illustrated in FIG. 14(a), the pipeline register 21 is composed of an output register 21U and an input register 21L which correspond to the bit width of the memory cell array MC1, and the enable signal EN is input to the input register 21L. In addition, the input register 21L outputs data stored (latched) therein to the parallel majority determination circuit 20 at a timing at which the enable signal EN is input, and fetches (that is, shifts) data stored in the output register 21U at the timing and stores (latches) the data. In addition, according to this, the output register 21U stores (latches) subsequent output data O at a timing at which the data is fetched by the input register 21L. Through repetition of the above-described operations of the input register 21L and the output register 21U, an operation as the pipeline register 21 is realized.

Next, a detailed configuration of the above-described majority determination input circuit 12 and the serial majority determination circuit 13 will be described with reference to FIG. 14(b). As illustrated in FIG. 14(b), the majority determination input circuit 12 in one piece of the serial majority determination circuit 16 includes an exclusive NOR circuit 12A and a mask flip-flop circuit 12B. In this configuration, the weighting coefficient W from the memory cell array MC1 and one-bit input data I are input to the exclusive NOR circuit 12A, and the exclusive NOR circuit 12A outputs a result of the exclusive NOR to the serial majority decision circuit 13 as the output data E. In addition, the connection presence/absence information C from the memory cell array MC1, and the enable signal EN are input to the mask flip-flop circuit 12B, and the mask flip-flop circuit 12B outputs the connection presence/absence information C to the serial majority decision circuit 13 at a timing at which the enable signal EN is input. In addition, the serial majority decision circuit 13 generates output data O through the operation based on the above-described output data E and the above-described connection presence/absence information C, and outputs the output data O to the output register 21U of the pipeline register 21. At this time, the above-described predetermined majority determination threshold value is retained in a register (not illustrated) in the serial majority decision circuit 13 and is referred to. According to this, an operation as the serial majority decision circuit 13 is realized.

Next, a detailed configuration of the parallel majority determination circuit 20 will be described with reference to FIG. 14(c). As illustrated in FIG. 14(c), the parallel majority determination circuit 20 is composed of an exclusive NOR circuit 20A and a mask flip-flop circuit 20B in the same number as the number of pieces of the input data I, and a parallel majority decision circuit 20C. In the configuration, the one-bit weighting coefficient W from the memory cell array MC2, and the one-bit output data O from the input register 21L of the pipeline register 21 are input to the exclusive NOR circuit 20A, and the exclusive NOR circuit 20A outputs a result of the exclusive OR to the parallel majority decision circuit 20C. In addition, the connection presence/absence information C from the memory cell array MC2 and the above-described enable signal EN are input to the mask flip-flop circuit 20B, and the mask flip-flop circuit 20B outputs the connection presence/absence information C to the parallel majority decision circuit 20C at a timing at which the enable signal EN is input. In addition, the parallel majority decision circuit 20C repeats the above-described operation based on each of the outputs from the exclusive NOR circuit 12A and the mask flip-flop circuit 20B which respectively correspond to a set of the weighting coefficient W and the connection presence/absence information C from the memory cell array MC2 in the number of times corresponding to the number of pieces of the output data O from the memory cell array MC1 (256 times in a case illustrated in FIG. 13 and FIG. 14), and outputs the result as output data O in a serial format through the output flip-flop circuit 22.

In addition, the above-described predetermined majority determination threshold value is retained in a not illustrated register in the parallel majority decision circuit 20C and is referred to. According to this, an operation as the parallel majority decision circuit 20 is realized.

At this time, according to the above-described operation of the pipeline register 21, in the parallel operator PP, for example, as illustrated in FIG. 14(d), when processing (in FIG. 14(d), indicated by a "memory cell block $15_{U1}$") with respect to output data O corresponding to 256 bits from the memory cell array MC1 is completed, processing (in FIG. 14(d), indicated by a "memory cell block $15_{U2}$") with respect to the subsequent output data O corresponding to 256 bits from the memory cell array MC1 and processing (in FIG. 14(d), indicated by a "memory cell block $15_{L1}$") with respect to the weighting coefficient W and the connection presence/absence information C, which correspond to 256 bits, from the memory cell array MC2 are simultaneously performed in parallel in appearance. In addition, when the processing with respect to output data O which corresponds to the memory cell block $15_{U2}$ and the processing with respect to the weighting coefficient W and the connection presence/absence information C which correspond to the memory cell block $15_{L1}$ are completed, processing (in FIG. 14(d), indicated by a "memory cell block $15_{U3}$") with respect to the further subsequent output data O corresponding to 256 bits from the memory cell array MC1 and processing (in FIG. 14(d), indicated by a "memory cell block $15_{L2}$") with respect to the subsequent weighting coefficient W and connection presence/absence information C, which correspond to 256 bits, from the memory cell array MC2 are simultaneously performed in parallel in appearance. Then, sequential, simultaneous, and in-parallel processing is executed with respect to the output data O, and the weighting coefficient W and the connection presence/absence information C, which correspond to 256 bits, respectively from the memory cell array MC1 and the memory cell array MC2.

Furthermore, the detailed configuration of the majority determination input circuit 12 and the serial majority determination circuit 13 illustrated in FIG. 14(b), and the detailed configuration of the parallel majority determination circuit 20 illustrated in FIG. 14(c) are configurations on the assumption that an output timing of the connection presence/absence information C from the memory cells 11 illustrated in FIG. 8 and subsequent thereto is faster than an output timing of the weighting coefficient W from the memory cells 10 illustrated in FIG. 8 and subsequent thereto, for example, by one cycle. Canceling of the deviation in the output timing is realized by the function of the mask flip-flop circuit 12B and the mask flip-flop circuit 20B illustrated in FIG. 14(b) and FIG. 14(c). On the other hand, the output timing of the weighting coefficient W and the output timing of the connection presence/absence information C may be set to be simultaneous and in parallel. In addition, in this case, the mask flip-flop circuit 12B and the mask flip-flop circuit 20B illustrated in FIG. 14(b) and FIG. 14(c) respectively are not necessary as the majority determination input circuit 12 and the parallel majority determination circuit 20.

As described above, according to the neural network integrated circuit C1-3 illustrated in FIG. 13 and FIG. 14, it is possible to model the neural network S1-2 illustrated in FIG. 12(a) at a processing speed that is approximately two times in comparison to other cases. Furthermore, the detailed configuration of the serial majority determination circuit 16 described with reference to FIG. 14 is also applicable as the detailed configuration of the serial majority determination circuit 16 included in the neural network integrated circuit C1-2 described with reference to FIG. 12.

More specifically, according to the neural network integrated circuit C1-3, each of the output data O output from the neural network integrated circuit C1' is buffered by one reference clock by the pipeline register 21 comprised between the neural network integrated circuit C1' and the neural network integrated circuit C2', and is output to the neural network integrated circuit C2' as the input data I in the neural network integrated circuit C2'. Accordingly, in the neural network integrated circuit C2', apparent parallel processing in the parallel majority determination circuit 20 in the neural network integrated circuit C2' is possible, and thus it is possible to efficiently realize the neural network S1-2 capable of corresponding to various brain functions at a high speed.

(F) With Regard to Fifth Example of Neural Network Integrated Circuit According to Second Embodiment Next, a fifth example of the neural network integrated circuit according to the second embodiment will be described with reference to FIG. 15. Furthermore, in FIG. 15, the same reference numeral will be given to the same constituent member as in the neural network circuit described with reference to FIG. 13 and FIG. 14 according to the second embodiment, and detailed description thereof will be omitted.

As illustrated in FIG. 15(a), the fifth example of the neural network integrated circuit described with reference to FIG. 15 according to the second embodiment is a neural network integrated circuit CP that has a configuration including, for example, four pieces of the neural network integrated circuits C1-3 described with reference to FIG. 13 and FIG. 14 according to the second embodiment, and has the configuration in which operations of the neural network integrated circuits C1-3 is controlled by a control unit CT. More specifically, as illustrated in FIG. 15(a), the neural network integrated circuit CP is composed of the four neural network integrated circuits C1-3 integrated on the memory block MA, four input selectors IS corresponding to each of the neural network integrated circuits C1-3, a first-in first-out (FIFO) format memory M1 for input control, a FIFO format memory M2 for output control, the control unit CT, and a bus B.

In this configuration, one-bit input data I is output to the bus B in a serial format through the memory M1 controlled by a writing strobe WS. According to this, each of the neural network integrated circuits C1-3 reads the input data I in a serial format through the corresponding input selector IS, performs the above-described processing, generates one-bit output data O, and outputs the output data O to the bus B in a serial format. In addition, the output data O from each of the neural network integrated circuit C1-3 is read in the memory M2 through the input selector IS. Then, the read output data O is output to the outside through the memory M2 that is controlled by a reading strobe RS. At this time, the control unit CT generates address data AD and an enable signal EN (refer to FIG. 13) which are respectively transmitted to the memory cell array MC1 and the memory cell array MC2 of each of the neural network integrated circuit C1-3, and a start signal ST on the basis of an execution signal RN from the outside, and outputs the address data AD and the enable signal EN, and the start signal ST to the neural network integrated circuit C1-3.

Next, a detailed configuration of the above-described control unit CT will be described with reference to FIG. 15(b).

As illustrated in FIG. 15(*b*), the control unit CT is composed of an up-counter 25₁ to an up-counter 25₅, a cyclic counter 26, a register 27₁ to a register 27₅ which respectively correspond to the up-counter 25₁ to the up-counter 25₅, and a register 27ₘ corresponding to the cyclic counter 26.

In this configuration, the cyclic counter 26 generates the above-described start signal ST on the basis of the above-described execution signal RN and a count value stored in the register 27ₘ, and outputs the start signal ST to each of the neural network integrated circuits C1-3 and the up-counter 25₁ to the up-counter 25₅ respectively. According to this, the up-counter 25₁ generates address data AD and an enable signal EN of which an output destination is a not illustrated FIFO-type input memory and the memory cell array MC1 of a first neural network integrated circuit C1-3, and outputs the address data AD and the enable signal EN to the input memory and the memory cell array MC1 of the first neural network integrated circuit C1-3. Next, the up-counter 25₂ generates address data AD and an enable signal EN of which an output destination is the memory cell array MC2 of the first neural network integrated circuit C1-3 and the memory cell array MC1 of the second neural network integrated circuit C1-3, and outputs the address data AD and the enable signal EN to the memory cell array MC2 of the first neural network integrated circuit C1-3 and the memory cell array MC1 of the second neural network integrated circuit C1-3. Next, the up-counter 25₃ generates address data AD and an enable signal EN of which an output destination is the memory cell array MC2 of the second neural network integrated circuit C1-3 and the memory cell array MC1 of a third neural network integrated circuit C1-3, and outputs the address data AD and the enable signal EN to the memory cell array MC2 of the second neural network integrated circuit C1-3 and the memory cell array MC1 of the third neural network integrated circuit C1-3. Next, the up-counter 25₄ generates address data AD and an enable signal EN of which an output destination is the memory cell array MC2 of the third neural network integrated circuit C1-3 and the memory cell array MC1 of a fourth neural network integrated circuit C1-3, and outputs the address data AD and the enable signal EN to the memory cell array MC2 of the third neural network integrated circuit C1-3 and the memory cell array MC1 of the fourth neural network integrated circuit C1-3. Finally, the up-counter 25₅ generates address data AD and an enable signal EN of which an output destination is the memory cell array MC2 of the fourth neural network integrated circuit C1-3 and a not illustrated FIFO-type output memory, and outputs the address data AD and the enable signal EN to the memory cell array MC2 of the fourth neural network integrated circuit C1-3 and the output memory. According to these, each of the neural network integrated circuits C1-3 execute the above-described operation in a serial format, for example, in the aspect illustrated in FIG. 14(*d*) on the basis of the start signal ST, the address data AD, and the enable signal EN, and finally, the output data O is output through the memory M2. Furthermore, in a case of changing the aspect of the neural network to be modeled (for example, the number of the neurons NR, a connection aspect therebetween, and the like), the control unit CT changes the contents of the above-described address data AD and the enable signal EN, or the output destination, and changes the operation of the neural network integrated circuit CP in correspondence with the change of the aspect.

As described above, according to the neural network integrated circuit CP illustrated in FIG. 15, it is possible to model a neural network having a further large scale while enhancing the degree of freedom of a configuration thereof.

(G) With Regard to Sixth Example and Like of Neural Network Integrated Circuit According to Second Embodiment Next, a sixth example and a seventh example of the neural network integrated circuit according to the second embodiment will be described with reference to FIG. 16. Furthermore, in FIG. 16, the same reference numeral will be given to the same constituent member as in the neural network circuit C1-2 described with reference to FIG. 12 according to the second embodiment, and detailed description thereof will be omitted.

First, the sixth example of the neural network integrated circuit according to the second embodiment will be described with reference to FIG. 16(*a*). As illustrated in FIG. 16(*a*), the sixth example is a neural network integrated circuit having a configuration in which for example, three pieces of the neural network integrated circuits C1-2 described with reference to FIG. 12 according to the second embodiment are comprised, and the three neural network integrated circuits C1-2 are connected in series. At this time, each of the neural network integrated circuits C1-2 is a neural network integrated circuit obtained by modeling a multi-stage neural network of a serial-input/parallel-processing/serial-output type as described above. The configuration illustrated in FIG. 16(*a*) is a neural network integrated circuit in which the neural network integrated circuits C1-2 are connected in series in an aspect corresponding to the first embodiment described with reference to FIG. 5. Accordingly, in this case, it is necessary for the number of pieces of output data O (the number of pieces of output data O that is output in a serial format) of one of the neural network integrated circuits C1-2 to correspond to the number of pieces of input data I (the number of pieces of input data I that is output in a serial format) of the neural network integrated circuit C1-2 that is connected in a next stage.

Next, the seventh example of the neural network integrated circuit according to the second embodiment will be described with reference to FIG. 16(*b*). As illustrated in FIG. 16(*b*), the seventh example is a neural network integrated circuit having a configuration in which for example, three pieces of the neural network integrated circuits C1-2 described with reference to FIG. 12 according to the second embodiment are comprised, and the neural network integrated circuits C1-2 are connected in parallel by common input data I. This configuration illustrated in FIG. 16(*b*) is a neural network integrated circuit in which the above-described neural network integrated circuits C1-2 are connected in parallel in an aspect corresponding to the first embodiment described with reference to FIG. 6. Accordingly, in this case, there is no limitation related to the number of bits in the output data O and the input data I as in the neural network integrated circuit illustrated in FIG. 16(*a*).

As described above, according to the neural network integrated circuits illustrated in FIG. 16, it is possible to model a neural network having a further large scale.

More specifically, according to the neural network integrated circuits illustrated in FIG. 16(*a*), a plurality of the neural network integrated circuits C1-2 are connected in series, and one piece of output data O from one of the neural network integrated circuits C1-2 is set to one piece of input data I to a neural network integrated circuit C1-2 in an immediately subsequent stage, and thus it is possible to efficiently realize a neural network capable of corresponding to more various brain functions. Further, according to the neural network integrated circuits illustrated in FIG. 16(*b*), one piece of input data I is commonly and respectively input to the plurality of neural network integrated circuits C1-2, and pieces of output data O are output individually from the plurality of neural network integrated circuits C1-2 one by one, and thus it is possible to efficiently realize a neural network capable of corresponding to more various brain functions.

As each described above, according to the configuration and the operation of the neural network circuit CCS', the neural network integrated circuit C1-2, and the like according to the second embodiment, as same as in the configuration and the operation of the neural network circuit CS, the neural network integrated circuit C1, and the like according to the first embodiment, it is possible to efficiently realize a neural network circuit while greatly reducing the circuit scale and the cost corresponding thereto.

(III) Modification Example

Figure 17:
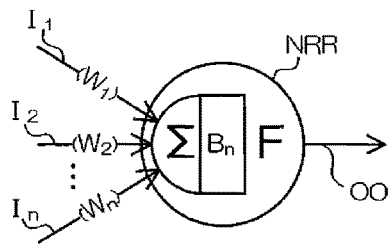
Figure 18:
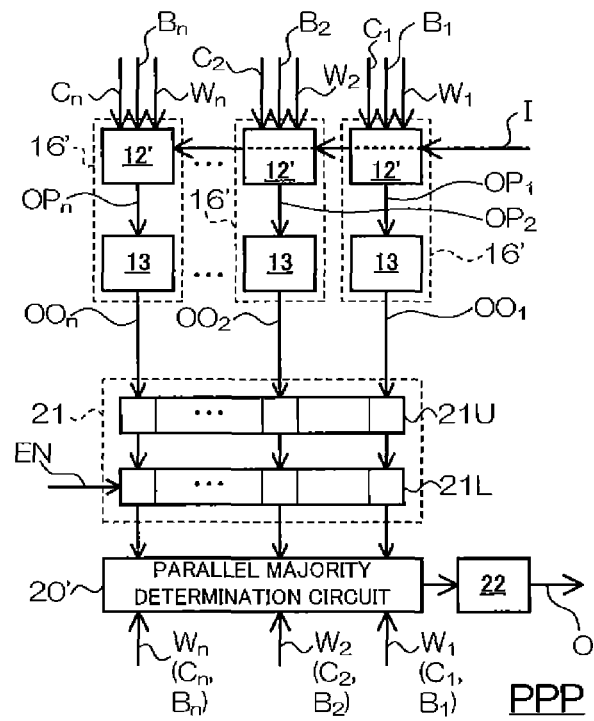
FIG. 18 is a diagram illustrating a detailed configuration of a neural network integrated circuit according to the modification example, (a) is a diagram illustrating an example of a circuit corresponding to the detailed configuration, (b) is a diagram illustrating an example of each of a majority determination input circuit and a serial majority determination circuit as the detailed configuration, and (c) is a diagram illustrating an example of a parallel majority determination circuit as the detailed configuration.
Figure 18:
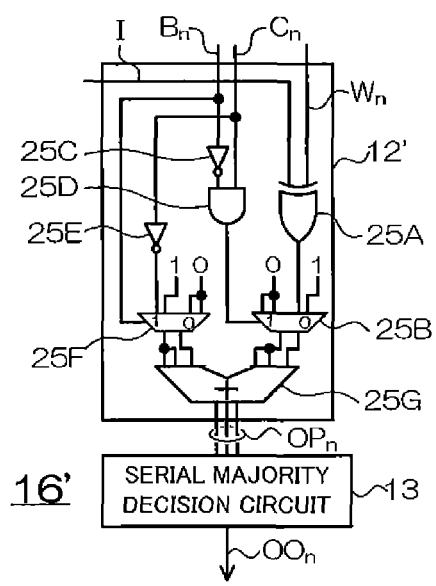
Figure 18:
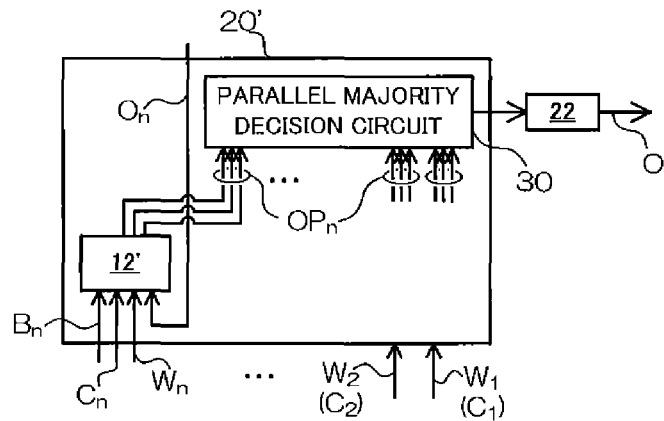

Next, a modification example of the first embodiment and the second embodiment according to the invention will be described with reference to FIG. 17 and FIG. 18. Furthermore, FIG. 17 is a diagram illustrating a neural network according to this modification example, and the like, and FIG. 18 is a diagram illustrating a detailed configuration of a neural network integrated circuit according to the modification example.

In the following modification example, as a method of more generally modeling a brain function, a concept of a "tendency coefficient" is newly added with respect to the neural network of which modeling is described as the first embodiment and the second embodiment. Furthermore, in the following description, the same reference numeral will be given to the same member that is included in the configuration described with reference to, particularly, FIG. 1 and FIG. 14, and detailed description thereof will be omitted.

First, the neural network that is modeled by adding the concept of the above-described tendency coefficient will be described with reference to FIG. 17.

In the neurons NR of the neural networks described in the first embodiment and the second embodiment, the above-described multiplication processing, the above-described addition processing, and the above-described activation processing with respect to each of a plurality of pieces of the input data I input from the outside are executed in the neurons NR, and the result is set as the output data O. In contrast, in the neural network according to the modification example, the above-described tendency coefficient indicating a tendency as a brain function, which is set in advance on the basis of the brain function modeled by the neural network, for every neuron is further added to the result of the above-described multiplication processing and the above-described addition processing with respect to the input data I. In addition, in the neural network according to the modification example, the activation processing is applied to the addition result of the tendency coefficient, and the result is output as output data according to the modification example. That is, in a case of the neural network according to the modification example, the "addition processing" further includes addition processing of the above-described tendency coefficient with respect to the addition processing in the neural network according to the first embodiment and the second embodiment. This tendency coefficient according to the modification example is a coefficient that indicates the tendency as the brain function for every neuron as described above, and is set in advance, and an absolute value thereof is an arbitrary integer that is equal to or less than the number n of the input data that is input to the neuron. Here, for example, the above-described "tendency" represents a tendency of a brain function and the like of which existence as an adjustment function for every neuron in a brain function that is a target of modeling is recognized. In addition, generally, there is a case that the above-described tendency coefficient may be referred to as a "bias value". A specific value of this tendency coefficient corresponds to the above-described tendency related to the neuron, and is set in advance for every neuron as an integer that is equal to or less than the number of pieces of the input data I. More specifically, for example, in a case where it is assumed that three pieces of input data I are input to one neuron, a value that can be taken as the above-described tendency coefficient includes seven values from "−3" to "3" (including "0"). Here, a case where the tendency coefficient is "0" corresponds to the neural networks according to the first embodiment and the second embodiment (refer to FIG. 1(a)).

In addition, as the neural network according to the modification example, when expressing a series of the multiplication processing, the addition processing (including the addition processing of the tendency coefficient. The same shall apply hereinafter in the modification example), and the activation processing as a mathematical formula, Expression (2) illustrated in FIG. 17(a) is obtained. At this time, as same as in the first embodiment and the second embodiment, the multiplication processing of multiplying each of the input data I by each of the weighting coefficient W respectively corresponds to an operation of a synapse in exchange of an electric signal between neurons NRR according to the modification example. In addition, as illustrated in FIG. 17(a), outputting of the output data O after application of an activation function F to the entirety of values after the addition processing according to the modification example corresponds to the activation processing according to the modification example.

Furthermore, when realizing the addition processing of adding a tendency coefficient $B_n$ according to the modification example to the addition result of each of the multiplication results between the input data I and the weighting coefficient W in terms of a circuit, in the following modification example, the tendency coefficient $B_n$ is divided (decomposed) with "1" set as a division unit, and processing of adding or subtracting "1" to or from each of the multiplication results is performed with respect to the multiplication results in a number corresponding to a value of the tendency coefficient $B_n$. That is, for example, in a case where the value of the tendency coefficient $B_n$ is "2", for example, "1" is added to a multiplication result of input data $I_1$ and a weighting coefficient $W_1$ as illustrated in FIG. 17(a), "1" is also added to a multiplication result of input data $I_2$ and a weighting coefficient $W_2$, and applies the activation function F in consideration of the addition. In addition, for example, in a case where the value of the tendency coefficient $B_n$ is "−3", for example, "1" is subtracted from the multiplication result of the input data $I_1$ and the weighting coefficient $W_1$, and the multiplication result of the input data $I_2$ and the weighting coefficient $W_2$ as illustrated in FIG. 17(a), and "1" is also subtracted from a multiplication result of the input data $I_3$ and the weighting coefficient $W_3$, and the activation function F is applied in consideration of the subtraction. At this time, whether to add or subtract "1" to or from any multiplication result is set in advance in correspondence with a brain function to be modeled.

Here, when realizing the addition processing and the like according to the modification example in terms of a circuit, meaning (definition) of the above-described connection presence/absence information C is different from the above-described first embodiment and the above-described second embodiment. That is, as illustrated in FIG. 17(b), in a case where the value of the tendency coefficient $B_n$ according to the modification example is "0", this case corresponds to the configuration of the above-described first embodiment and the above-described second embodiment. In addition, in this case, even between neurons NRR according to the modification example, only in a case where the connection presence/absence information C indicates "connection presence" with respect to between the neurons NRR (in FIG. 17(b), "1"), a multiplication result between corresponding input data I and weighting coefficient W is input to one neuron NRR (refer to the uppermost stage and the second stage from the upper side in FIG. 17(b)). At this time, a value of the output data after the activation processing becomes "0" or "1". In addition, the same addition processing and activation processing as in the first embodiment and the second embodiment in the neuron NRR are performed.

In contrast, in a case where the tendency coefficient $B_n$ according to the modification example is not "0", when the connection presence/absence information C is set to "1" (that is, indicating "connection presence") with respect to a multiplication result (a multiplication result between the input data I and the weighting coefficient W) to or from which the division result of the tendency coefficient $B_n$ is added or subtracted, "1" as a value obtained by decomposing the tendency coefficient $B_n$ that is a positive value is added to the multiplication result, and is input to one neuron NRR (refer to the lowest stage in FIG. 17(b). On the other hand, in a case where the connection presence/absence information C is set to "0" (that is, indicating "connection absence"), "−1" as a value obtained by decomposing the tendency coefficient $B_n$ that is a negative value is added to the above-described multiplication result (that is, "1" is subtracted), and is input to the one neuron NRR (refer to a second stage from a lower side in FIG. 17(b)). In this case, a value of the output data after the activation processing becomes "−2" or "0" (in a case where the tendency coefficient $B_n$ is a negative value. Refer to a second stage from a lower side in FIG. 17(b)) or "2" or "0" (in a case where the tendency coefficient $B_n$ is a positive value. Refer to the lowest stage in FIG. 17(b)). In addition, next, application is made to the addition processing and the activation processing as the modification example in the neuron NRR.

Next, description will be given of a detailed configuration of, particularly, the parallel operator (refer to a symbol PP in FIG. 13) in a case of applying the modification example with respect to the neural network integrated circuit C1-3 illustrated in FIG. 13 with reference to FIG. 14 and FIG. 18.

First, as illustrated in FIG. 18(a), the parallel operator PPP according to the modification example is composed of a serial majority determination circuit 16' comprising a majority determination input circuit 12' and the serial majority determination circuit 13 each according to the modification example in a number corresponding to the bit width of the memory cell array MC1, the same pipeline register 21 as same as in the neural network integrated circuit C1-3, and a parallel majority determination circuit 20' according to the modification example which outputs the output data O through the same output flip-flop circuit 22 as same as in the neural network integrated circuit C1-3. The pipeline register 21 in the configuration has the same configuration as same as in the case described with reference to FIG. 14(a), and realizes the same operation. In addition, in the parallel operator PPP according to the modification example, the weighting coefficient W, the connection presence/absence information C, and the tendency coefficient $B_n$ are simultaneously input to the parallel operator PPP in parallel from the memory cell array MC1 or the memory cell array MC2 differently from the parallel operator PP according to the second embodiment in which the weighting coefficient W and the connection presence/absence information C are input at a timing different by one cycle.

Next, a detailed configuration of the majority determination input circuit 12' according to the modification example will be described with reference to FIG. 18(b). As illustrated in FIG. 18(b), the majority determination input circuit 12' in one piece of the serial majority determination circuit 16' is composed of an exclusive OR circuit 25A, a selector 25B and a selector 25F, an inverting amplification circuit 25C and an inverting amplification circuit 25E, an AND circuit 25D, and an addition circuit 25G. At this time, the mask flip-flop circuit 12B illustrated in FIG. 14(b) is not necessary since the weighting coefficient W, the connection presence/absence information C, and the tendency coefficient $B_n$ are simultaneously input to the parallel operator PPP in parallel. In the above-described configuration, the weighting coefficient W from the memory cell array MC1 and the one-bit input data I are input to the exclusive OR circuit 25A, and an exclusive OR result thereof is output to a terminal "0" of the selector 25B. On the other hand, the connection presence/absence information C from the memory cell array MC1, and data obtained by inverting one-bit data obtained by dividing the tendency coefficient $B_n$ by the inverting amplification circuit 25C are input to the AND circuit 25D, and an AND result thereof is output to a control terminal of the selector 25B. According to this, the selector 25B selects one of the above-described exclusive OR result or 0 data on the basis of the connection presence/absence information C and the tendency coefficient $B_n$, and outputs the selected result or data to one terminal of the addition circuit 25G. Next, one-bit data obtained by dividing the tendency coefficient $B_n$ is input to a control terminal of the selector 25F, and data obtained by inverting the connection presence/absence information C by the inverting amplification circuit 25E is input to a terminal "1" of the selector 25F. According to this, the selector 25F selects any one of output data from the inverting amplification circuit 25E and 0 data on the basis of the tendency coefficient $B_n$, and outputs the selected data to the other terminal of the addition circuit 25G. According to these, the addition circuit 25G adds the output data from the selector 25B and the selector 25F, and outputs the result to the serial majority decision circuit 13 as output data $OP_n$. At this time, a value that can be taken by output data $OP_n$ includes five kinds of "−2", "−1", "0", "1", or "2" as illustrated in FIG. 17(b), and thus the output data $OP_n$ becomes three-bit data. In addition, the serial majority decision circuit 13 performs processing corresponding to the same activation processing as in the case illustrated in FIG. 14 with respect to the output data $OP_n$, and outputs the result to the output register 21U of the pipeline register 21 as output data $OO_n$ (refer to FIG. 17(a)). At this time, the configuration for realizing the operation as the serial majority decision circuit 13 by retaining the above-described predetermined majority determination threshold value in a not illustrated register in the serial majority decision circuit 13 and referring to the predetermined majority determination threshold value is the same as in the serial majority decision circuit 13 illustrated in FIG. 14.

Next, a detailed configuration of the parallel majority determination circuit 20' according to the modification example will be described with reference to FIG. 18(c). As illustrated in FIG. 18(c), the parallel majority determination circuit 20' is composed of a majority determination input circuit 12' comprising the same configuration and the like as those of the majority determination input circuit 12' as described above with reference to FIG. 18(b), and in a number corresponding to the bit width of the memory cell array MC2, and a parallel majority decision circuit 30. In this configuration, the one-bit weighting coefficient W, connection presence/absence information C, and tendency coefficient $B_n$ from the memory cell array MC2, and the one-bit output data O from the input register 21L of the pipeline register 21 are input to the majority determination input circuit 12'. In addition, each of the majority determination input circuit 12' outputs results, which are obtained by executing the same operation as the operation described with reference to FIG. 18(b) with respect to the weighting coefficient W, the connection presence/absence information C, the tendency coefficient $B_n$, and the one-bit output data O from the input register 21L, to the parallel majority decision circuit 30. In addition, the parallel majority decision circuit 30 repeats the above-described majority decision operation based on a set of the weighting coefficient W and the connection presence/absence information C from the memory cell array MC2 and the output data $OP_n$ from each of the majority determination input circuits 12' corresponding to the tendency coefficient $B_n$ by the number of times corresponding to the number of pieces of the output data O from the memory cell array MC1 (for example, 256 times as in the case described with reference to FIG. 13 and FIG. 14), and outputs the result as output data O in a serial format through the output flip-flop circuit 22. At this time, as the configuration of the parallel majority decision circuit 30 according to the modification example, specifically, for example, a configuration in which addition circuits for adding pieces of the output data $OP_n$ corresponding to adjacent bits are hierarchically provided, and a symbol bit of a final addition result is output to the above-described output flip-flop circuit 22 is considered. In addition, the configuration for realizing the operation as the above-described parallel majority decision circuit 30 by retaining the predetermined majority determination threshold value in a not illustrated register in the parallel majority decision circuit 30 and referring to the predetermined majority determination threshold value is the same as in the parallel majority decision circuit 20C illustrated in FIG. 14.

In addition, execution of sequential, simultaneous, and in-parallel processing with respect to the output data O, the weighting coefficient W, the connection presence/absence information C and the tendency coefficient $B_n$ each of which corresponds to 256 bits from the memory cell array MC1 and the memory cell array MC2 through the operation of the pipeline register 21 is the same as in the parallel operator PP illustrated in FIG. 14.

As described above, according to the modification example illustrated in FIG. 17 and FIG. 18, for example, it is possible to model the neural network S1-2 to which the tendency coefficient $B_n$ is applied as illustrated in FIG. 12(a) at a processing speed that is approximately two times in comparison to other cases.

In addition, according to the configuration and the operation of the parallel operator PPP included in the neural network integrated circuit according to the modification example, as a neural network integrated circuit obtained by modeling the neural network (refer to FIG. 17) according to the modification example, it is possible to greatly reduce the circuit scale and the cost corresponding thereto.

More specifically, according to the configuration and the operation of the parallel operator PPP included in the neural network integrated circuit according to the modification example, in a case where the predetermined tendency coefficient $B_n$ based on a brain function is to be further added to an addition result of the above-described multiplication processing, the tendency coefficient $B_n$ is input to any one of the majority determination input circuit 12', which are provided in a number corresponding to an absolute value of the tendency coefficient $B_n$, in a divided state. In addition, in correspondence with the connection presence/absence information C, an additional addition result of the tendency coefficient $B_n$ with respect to the addition result of each of the multiplication processing is output from the majority determination input circuit 12' to the parallel majority decision circuit 30. According to this, as a result, the parallel majority decision circuit 30 outputs a value of "1" as the output data O when the sum value obtained by adding the additional addition results of the tendency coefficient $B_n$ in each of the majority determination input circuits 12' is a positive value or 0, and outputs a value of "0" as the output data O when the sum value is a negative value. Accordingly, even in a case where the predetermined tendency coefficient $B_n$ based on the brain function is to be introduced, it is possible to efficiently realize the neural network corresponding to the brain function of human beings while greatly reducing the circuit scale and the cost corresponding thereto.

Furthermore, in the above-described modification example, the tendency coefficient $B_n$ according to the modification example is divided (decomposed) with "1" set as a division unit, and the processing of adding or subtracting "1" to or from each of the multiplication results between the input data I and the weighting coefficient W is performed with respect to the multiplication results in a number corresponding to a value of the tendency coefficient $B_n$. However, the tendency coefficient $B_n$ may be stored in a not illustrated memory in advance as one value without being divided, and the tendency coefficient $B_n$ may be added to or subtracted from a result obtained by adding the respective multiplication results. In this case, a not illustrated memory corresponds to an example of a tendency coefficient storage unit according to the invention.

In addition, in the first embodiment, the second embodiment, and the modification example, description has been given of a case where in the output data O, the input data I, the weighting coefficient W, and the like, values thereof are set to "1" or "0" and the like. However, in addition to this case, the neural network circuits or the neural network integrated circuits may be configured by setting the above-described values of "0" to the value of "−1" for convenience of circuit design and the like.

INDUSTRIAL APPLICABILITY

As described above, this invention can be used in fields such as a neural network circuit and the like obtained by modeling a neural network, and particularly, when the invention is applied to a case of developing, for example, a neural network circuit of which the cost is reduced or which are efficient, a particularly significant effect is attained.

EXPLANATION OF REFERENCE NUMERALS 1, 10, 11: MEMORY CELL
2: MAJORITY DETERMINATION CIRCUIT
12, 12': MAJORITY DETERMINATION INPUT CIRCUIT
12A, 20A: EXCLUSIVE NOR CIRCUIT 12B, 20B: MASK FLIP-FLOP CIRCUIT
13, 16, 16': SERIAL MAJORITY DETERMINATION CIRCUIT
15, $15_{U1}$, $15_{U2}$, $15_{L1}$, $15_{U3}$, $15_{L2}$: MEMORY CELL BLOCK
20, 20': PARALLEL MAJORITY DETERMINATION CIRCUIT
20C, 30: PARALLEL MAJORITY DECISION CIRCUIT
21: PIPELINE REGISTER
21U: OUTPUT REGISTER
21L: INPUT REGISTER
22: OUTPUT FLIP-FLOP CIRCUIT
$25_1$, $25_2$, $25_3$, $25_4$, $25_5$: UP-COUNTER
25A: EXCLUSIVE OR CIRCUIT
25B, 25F: SELECTOR
25C, 25E: INVERTING AMPLIFICATION CIRCUIT
25D: AND CIRCUIT
25G: ADDITION CIRCUIT
26: CYCLIC COUNTER
$27_1$, $27_2$, $27_3$, $27_4$, $27_5$, $27_m$: REGISTER
I, $I_1$, $I_2$, $I_3$, $I_4$, $I_5$, $I_6$, $I_7$, $I_8$, $I_n$, $I_m$: INPUT DATA
NR, NRR: NEURON
$G_1$: XNOR GATE
$G_2$: XOR GATE
$B_n$ TENDENCY COEFFICIENT
O, $O_1$, $O_2$, $O_3$, $O_4$, $O_5$, $O_n$, $O_m$, $O_{2m}$, $O_{10}$, $O_{20}$, $O_{30}$, $O_{40}$, $O_{11}$, $O_{21}$, $O_{31}$, $O_{41}$, $O_{1n}$, $O_{2n}$, $O_{3n}$, $O_{n0}$, $O_{n1}$, OO, $OP_n$, $E_1$, $E_2$, $E_3$, $E_4$, $E_{10}$, $E_{20}$, $E_{30}$, $E_{40}$, $E_{11}$, $E_{21}$, $E_{31}$, $E_{41}$, $E_{n0}$, $E_{n1}$: OUTPUT DATA
$W_1$, $W_2$, $W_n$: WEIGHTING COEFFICIENT
S, S1, SS1, SS2, SS3, S1', S2', S1-2, S1-3: NEURAL NETWORK
S': NETWORK
C1, C2, C3, C4, CC1, CC2, CC3, C1', C2', CP, C1-2, C1-3: NEURAL NETWORK INTEGRATED CIRCUIT
CS, CS1, CS2, CS3, CS4, CS5, CS11, CS12, CS21, C22, CS31, CS32, CS1n, CS1m, CS2n, CS2m, CS3n, CS3p, CS4q, CSm, CCS': NEURAL NETWORK CIRCUIT
CS': NETWORK CIRCUIT
$T_1$, $T_2$, $T_3$, $T_4$, $T_5$, $T_6$, $T_7$, $T_8$, $T_9$, $T_{10}$, $T_{11}$, $T_{12}$, $T_{13}$, $T_{14}$, $T_{15}$, $T_{16}$, $T_{17}$, $T_{18}$, $T_{19}$, $T_{20}$, $T_{21}$, $T_{22}$, $T_{23}$, $T_{24}$, $T_{25}$, $T_{26}$, $T_{27}$, $T_{28}$, $T_{29}$, $T_{30}$: TRANSISTOR
$IV_1$, $IV_2$, $IV_3$, $IV_4$: INVERTER
$LI_n$, $/LI_n$, W1, W2, LO, /LO: CONNECTION LINE
M: MATCH LINE
/M: INVERTED MATCH LINE
SA: SENSE AMPLIFIER
$\phi_1$, $\phi_2$, $/\phi_2$, $\phi_3$: TIMING SIGNAL
TG: TIMING GENERATION CIRCUIT
SW1, SW2, SW3, SW4: SWITCH
SB1, SB2, SB3, SB4: SWITCH BOX
$M_1$, $M_2$, $M_3$, $M_4$, $M_5$: SELECTOR
MC1, MC2: MEMORY CELL ARRAY
EN: ENABLE SIGNAL
CLK: REFERENCE CLOCK SIGNAL
ECK: EVEN REFERENCE CLOCK
PP, PPP: PARALLEL OPERATOR
CT: CONTROL UNIT
MA: MEMORY BLOCK
IS: INPUT SELECTOR
$CL_1$, $CL_2$, M1, M2: MEMORY
WS: WRITING STROBE
B: BUS
RS: READING STROBE
RN: EXECUTION SIGNAL
AD: ADDRESS DATA
ST: START SIGNAL
$S_{c1}$, $S_{c2}$, $S_{c3}$, $S_{c4}$, $S_{c5}$: SWITCHING CONTROL SIGNAL

The invention claimed is:

1. A neural network circuit comprising: a plurality of first circuit units which realize a multiplication function of multiplying one-bit input data and an one-bit weighting coefficient; and a second circuit unit that realizes addition/application function of adding multiplication results in the first circuit units, and outputs one-bit output data by applying an activation function to the addition result, wherein each of the first circuit units includes, a storage unit that stores any one of the weighting coefficient that is "1" or "0", or a predetermined value that is set in advance, and an output unit that outputs "1" at a timing corresponding to an input timing of the input data in a case where the weighting coefficient and a value of the input data match each other in a case where the weighting coefficient is stored in the storage unit, outputs "0" at the timing corresponding to the input timing of the input data in a case where the weighting coefficient and the value of the input data are different from each other, and outputs the predetermined value at the timing corresponding to the input timing of the input data in a case where the predetermined value is stored in the storage unit, and the second circuit unit outputs "1" or "0" as the output data on the basis of a difference between a total number of the first circuit units which output "1", and a total number of the first circuit units which output "0".

2. The neural network circuit according to claim 1, wherein the second circuit unit outputs "1" as the output data in a case where the difference between the total number of the first circuit units which output "1" and the total number of the first circuit units which output "0" is equal to or greater than a threshold value that is determined in advance, and outputs "0" as the output data in a case where the difference is less than the threshold value.

3. The neural network circuit according to claim 2, wherein the neural network circuit comprises the same number of the first circuit units as the plurality of pieces of the input data, and the number of pieces of the input data and the number of the first circuit units are numbers that are set in advance on the basis of a brain function that is modeled by the neural network circuit.

4. A neural network integrated circuit comprising:

m pieces of the neural network circuits (m is an integer of two or greater), in which the number of the first circuit units to which the input data is input respectively is n (n is an integer of two or greater), according to claim 3, wherein n pieces of the input data are commonly input to the neural network circuits in parallel, and the output data is output from the neural network circuits respectively.

5. A neural network integrated circuit comprising:

a plurality of the neural network integrated circuits according to claim 4 in which n and m are equal to each other and which are connected in series, wherein the output data from one piece of the neural network integrated circuit is set as the input data in another neural network integrated circuit that is connected to be immediately subsequent to the neural network integrated circuit.

6. A neural network integrated circuit comprising:

k pieces of the neural network integrated circuits (k is a natural number of two or greater) according to claim 4, wherein n pieces of the input data are commonly input to each of the neural network integrated circuits in parallel, and m pieces of the output data are output from each of the neural network integrated circuits in parallel respectively.

7. A neural network integrated circuit comprising:

a plurality of the neural network integrated circuits according to claim 4; and a switch unit which connects the neural network integrated circuits to each other in an array shape, and switches the input data and the output data with respect to the neural network integrated circuits, and in which a switching operation in the switch unit is set in advance in correspondence with the brain function.

8. The neural network circuit according to claim 2, wherein the weighting coefficient is set in advance in correspondence with a brain function that is modeled by the neural network circuit, the storage unit includes, a first storage unit that stores the weighting coefficient and outputs the weighting coefficient to the output unit, and a second storage unit that stores the predetermined value set in advance in correspondence with the brain function, and outputs the predetermined value to the output unit, and the output unit outputs "1" at the timing corresponding to the input timing of the input data in a case where the weighting coefficient output from the first storage unit and the value of the input data match each other, outputs "0" at the timing corresponding to the input timing of the input data in a case where the weighting coefficient that is output and the value of the input data are different from each other, and outputs the predetermined value at the timing corresponding to the input timing of the input data in a case where the predetermined value is output from the second storage unit.

9. The neural network circuit according to claim 8, wherein in a case where a tendency coefficient, which is set in advance in correspondence with the brain function and is an integer indicating a tendency as the brain function for every neuron, and of which an absolute value is equal to or greater than 0 and equal to or less than the number of pieces of the input data, is to be further added to an addition result of the multiplication results as an addition function in the addition/application function, the tendency coefficient is input, in a divided state, to any one of the first circuit units, the number of which is the same as an absolute value of the tendency coefficient, each of the first circuit units, to which the tendency coefficient is input in the divided state, outputs an additional addition result of the tendency coefficient with respect to the addition result of each of the multiplication results in correspondence with the predetermined value to the second circuit unit, and the second circuit unit outputs "1" as the output data when the sum value obtained by adding a plurality of the additional addition results of the tendency coefficient in each of the first circuit units is a positive value or 0, and outputs "0" as the output data when the sum value is a negative value.

10. The neural network circuit according to claim 8, further comprising:

a tendency coefficient storage unit that stores a tendency coefficient, which is set in advance in correspondence with the brain function and is an integer indicating a tendency as the brain function for every neuron, and of which an absolute value is equal to or greater than 0 and equal to or less than the number of pieces of the input data, wherein the second circuit unit outputs "1" as the output data when the sum value obtained by further adding the tendency coefficient with respect to an addition result of the multiplication results from the first circuit units in correspondence with the predetermined value is positive value or 0, and outputs "0" as the output data when the sum value is a negative value.

11. The neural network circuit according to claim 8, wherein the number of pieces of the input data is one, the number of pieces of the output data, the number of the first storage units, the number of the second storage units, the number of the first circuit units, and the number of the second circuit units are numbers of two or greater which are set in advance in correspondence with the brain function, each of the weighting coefficient and the predetermined value are values which are set in advance in correspondence with the brain function, the output units of each of the first circuit units respectively output the multiplication result for every output data on the basis of the weighting coefficient and the input data which correspond to the output data, each of the second circuit units outputs "1" as the output data when a value obtained by subtracting a total number of the multiplication results which are "0" from a total number of the multiplication results which are "1" is equal to or greater than the threshold value in a case where the predetermined value is the value that is set in advance, and outputs "0" as the output data when the value obtained through the subtraction is less than the threshold value in a case where the predetermined value is the value that is set in advance.

12. The neural network circuit according to claim 8, wherein the number of pieces of the output data and the number of the second circuit units are one, the number of pieces of the input data, the number of the first storage units, the number of the second storage units, and the number of the first circuit units are numbers of two or greater which are set in advance in correspondence with the brain function, each of the weighting coefficient and the predetermined value are values which correspond to the brain function, each of the first circuit units outputs each of the multiplication result for every input data on the basis of the weighting coefficient respectively corresponding to each of the input data and each of the input data, the second circuit units output "1" as the output data when a value obtained by subtracting a total number of the multiplication results which are "0" from a total number of the multiplication results which are "1" is equal to or greater than the threshold value in a case where the predetermined value is the value that is set in advance, and outputs "0" as the output data when the value obtained through the subtraction is less than the threshold value in a case where the predetermined value is the value that is set in advance.

13. A neural network integrated circuit comprising:
a first neural network circuit comprising:
a neural network circuit comprising: a plurality of first circuit units which realize a multiplication function of multiplying one-bit input data and an one-bit weighting coefficient; and a second circuit unit that realizes addition/application function of adding multiplication results in the first circuit units, and outputs one-bit output data by applying an activation function to the addition result,
wherein each of the first circuit units includes,
a storage unit that stores any one of the weighting coefficient that is "1" or "0", or a predetermined value that is set in advance, and
an output unit that outputs "1" at a timing corresponding to an input timing of the input data in a case where the weighting coefficient and a value of the input data match each other in a case where the weighting coefficient is stored in the storage unit, outputs "0" at the timing corresponding to the input timing of the input data in a case where the weighting coefficient and the value of the input data are different from each other, and outputs the predetermined value at the timing corresponding to the input timing of the input data in a case where the predetermined value is stored in the storage unit, and
the second circuit unit outputs "1" or "0" as the output data on the basis of a difference between a total number of the first circuit units which output "1", and a total number of the first circuit units which output "0";
wherein the second circuit unit outputs "1" as the output data in a case where the difference between the total number of the first circuit units which output "1" and the total number of the first circuit units which output "0" is equal to or greater than a threshold value that is determined in advance, and outputs "0" as the output data in a case where the difference is less than the threshold value;
wherein the weighting coefficient is set in advance in correspondence with a brain function that is modeled by the neural network circuit,
the storage unit includes,
a first storage unit that stores the weighting coefficient and outputs the weighting coefficient to the output unit, and
a second storage unit that stores the predetermined value set in advance in correspondence with the brain function, and outputs the predetermined value to the output unit, and
the output unit outputs "1" at the timing corresponding to the input timing of the input data in a case where the weighting coefficient output from the first storage unit and the value of the input data match each other, outputs "0" at the timing corresponding to the input timing of the input data in a case where the weighting coefficient that is output and the value of the input data are different from each other, and outputs the predetermined value at the timing corresponding to the input timing of the input data in a case where the predetermined value is output from the second storage unit;
wherein the number of pieces of the input data is one, the number of pieces of the output data, the number of the first storage units, the number of the second storage units, the number of the first circuit units, and the number of the second circuit units are numbers of two or greater which are set in advance in correspondence with the brain function,
each of the weighting coefficient and the predetermined value are values which are set in advance in correspondence with the brain function,
the output units of each of the first circuit units respectively output the multiplication result for every output data on the basis of the weighting coefficient and the input data which correspond to the output data, and
each of the second circuit units outputs "1" as the output data when a value obtained by subtracting a total number of the multiplication results which are "0" from a total number of the multiplication results which are "1" is equal to or greater than the threshold value in a case where the predetermined value is the value that is set in advance, and outputs "0" as the output data when the value obtained through the subtraction is less than the threshold value in a case where the predetermined value is the value that is set in advance; and
a second neural network circuit comprising:
a neural network circuit comprising: a plurality of first circuit units which realize a multiplication function of multiplying one-bit input data and an one-bit weighting coefficient; and a second circuit unit that realizes addition/application function of adding multiplication results in the first circuit units, and outputs one-bit output data by applying an activation function to the addition result,
wherein each of the first circuit units includes,
a storage unit that stores any one of the weighting coefficient that is "1" or "0", or a predetermined value that is set in advance, and
an output unit that outputs "1" at a timing corresponding to an input timing of the input data in a case where the weighting coefficient and a value of the input data match each other in a case where the weighting coefficient is stored in the storage unit, outputs "0" at the timing corresponding to the input timing of the input data in a case where the weighting coefficient and the value of the input data are different from each other, and outputs the predetermined value at the timing corresponding to the input timing of the input data in a case where the predetermined value is stored in the storage unit, and
the second circuit unit outputs "1" or "0" as the output data on the basis of a difference between a total number of the first circuit units which output "1", and a total number of the first circuit units which output "0";
wherein the second circuit unit outputs "1" as the output data in a case where the difference between the total number of the first circuit units which output "1" and the total number of the first circuit units which output "0" is equal to or greater than a threshold value that is determined in advance, and outputs "0" as the output data in a case where the difference is less than the threshold value;
wherein the weighting coefficient is set in advance in correspondence with a brain function that is modeled by the neural network circuit,
the storage unit includes,
a first storage unit that stores the weighting coefficient and outputs the weighting coefficient to the output unit, and a second storage unit that stores the predetermined value set in advance in correspondence with the brain function, and outputs the predetermined value to the output unit, and the output unit outputs "1" at the timing corresponding to the input timing of the input data in a case where the weighting coefficient output from the first storage unit and the value of the input data match each other, outputs "0" at the timing corresponding to the input timing of the input data in a case where the weighting coefficient that is output and the value of the input data are different from each other, and outputs the predetermined value at the timing corresponding to the input timing of the input data in a case where the predetermined value is output from the second storage unit;

wherein the number of pieces of the output data and the number of the second circuit units are one, the number of pieces of the input data, the number of the first storage units, the number of the second storage units, and the number of the first circuit units are numbers of two or greater which are set in advance in correspondence with the brain function, each of the weighting coefficient and the predetermined value are values which correspond to the brain function, each of the first circuit units outputs each of the multiplication result for every input data on the basis of the weighting coefficient respectively corresponding to each of the input data and each of the input data, and the second circuit units output "1" as the output data when a value obtained by subtracting a total number of the multiplication results which are "0" from a total number of the multiplication results which are "1" is equal to or greater than the threshold value in a case where the predetermined value is the value that is set in advance, and outputs "0" as the output data when the value obtained through the subtraction is less than the threshold value in a case where the predetermined value is the value that is set in advance, wherein each of the output data output from the first neural network circuit, to which one piece of input data is input, according to the first neural network circuit is set as input data in the second neural network circuit according to the second neural network circuit, and one piece of output data is output from the second neural network circuit.

14. The neural network integrated circuit according to claim 13, further comprising:

a register unit provided between the first neural network circuit and the second neural network circuit, wherein the register unit buffers the output data that is output from the first neural network circuit by one reference clock, and outputs the buffered data to the second neural network circuit as the input data in the second neural network circuit.

15. A neural network integrated circuit comprising:

a plurality of the neural network integrated circuits, which are connected in series, according to claim 13, wherein one piece of the output data from one of the neural network integrated circuits of the plurality of neural network integrated circuits is set as one piece of the input data to a neural network integrated circuit in an immediately subsequent stage.

16. A neural network integrated circuit comprising:

a plurality of the neural network integrated circuits according to claim 13, wherein one piece of the input data is commonly input to the plurality of neural network integrated circuits according to claim 13, and pieces of the output data are output one by one individually from the plurality of neural network integrated circuits according to claim 13.

* * * * *